US012638711B2

(12) United States Patent
Xin et al.

(10) Patent No.: US 12,638,711 B2
(45) Date of Patent: May 26, 2026

(54) DISPLAY SUBSTRATE, DISPLAY PANEL AND DISPLAY DEVICE

(71) Applicants: Ordos Yuansheng Optoelectronics Co., Ltd., Ordos (CN); BOE Technology Group Co., Ltd., Beijing (CN)

(72) Inventors: Haoyi Xin, Beijing (CN); Wei Li, Beijing (CN); Yanfeng Li, Beijing (CN); Min Zhang, Beijing (CN); Rui Fan, Beijing (CN); Xiao Yan, Beijing (CN); Zhao Liu, Beijing (CN); Chenrong Qiao, Beijing (CN); Jingjing Xu, Beijing (CN); Jianxiong Fan, Beijing (CN); Shangpeng Liu, Beijing (CN); Jing Li, Beijing (CN); Ruigang Xin, Beijing (CN); Yongqiang Zhang, Beijing (CN); Lei Yao, Beijing (CN); Ning Wang, Beijing (CN)

(73) Assignees: Ordos Yuansheng Optoelectronics Co., Ltd., Ordos (CN); BOE Technology Group Co., Ltd., Beijing (CN)

( * ) Notice: Subject to any disclaimer, the term of this patent is extended or adjusted under 35 U.S.C. 154(b) by 98 days.

(21) Appl. No.: 18/702,246

(22) PCT Filed: Nov. 30, 2022

(86) PCT No.: PCT/CN2022/135621
§ 371 (c)(1),
(2) Date: Apr. 17, 2024

(87) PCT Pub. No.: WO2024/113257
PCT Pub. Date: Jun. 6, 2024

(65) Prior Publication Data
US 2025/0231452 A1 Jul. 17, 2025

(51) Int. Cl.
| | | |
|---|---|---|
| *G02F 1/1335* | (2006.01) | |
| *G02F 1/1362* | (2006.01) | |
| *G02F 1/1368* | (2006.01) | |

(52) U.S. Cl.
CPC .. *G02F 1/133512* (2013.01); *G02F 1/133514* (2013.01); *G02F 1/133528* (2013.01);
(Continued)

(58) Field of Classification Search
CPC ............. G02F 1/1368; G02F 1/136209; G02F 1/133528; G02F 1/136286; G02F 1/133512; G02F 1/133514
See application file for complete search history.

(56) References Cited

U.S. PATENT DOCUMENTS

| 9,941,303 | B1* | 4/2018 | Zhou | ................. | G02F 1/136209 |
|---|---|---|---|---|---|
| 2017/0293172 | A1* | 10/2017 | Zhang | ............... | G02F 1/134309 |
(Continued)

FOREIGN PATENT DOCUMENTS

| CN | 101276087 A | 10/2008 |
|---|---|---|
| CN | 102645796 A | 8/2012 |
(Continued)

*Primary Examiner* — Jia X Pan
(74) *Attorney, Agent, or Firm* — Workman Nydegger

(57) ABSTRACT

A display substrate, a display panel and a display device, including: a first base substrate, a first polarizer located on one side of the first base substrate, a data line located on a side, away from the first polarizer, of the first base substrate, and the extension direction of the data line is substantially perpendicular to the absorption axis of the first polarizer.

16 Claims, 33 Drawing Sheets

(52) U.S. Cl.
    CPC .. *G02F 1/136209* (2013.01); *G02F 1/136286*
                (2013.01); *G02F 1/1368* (2013.01)

(56)                    References Cited

U.S. PATENT DOCUMENTS

| 2017/0373464 | A1* | 12/2017 | Inoue | .................... | H01S 5/0287 |
| 2018/0102382 | A1* | 4/2018 | Peng | .................... | G02F 1/1368 |
| 2019/0227371 | A1* | 7/2019 | Kawamura | ....... | G02F 1/136286 |
| 2024/0142838 | A1* | 5/2024 | Yu | ........................ | G02F 1/1368 |

FOREIGN PATENT DOCUMENTS

| CN | 105785633 | A | 7/2016 |
| CN | 105842944 | A | 8/2016 |
| CN | 107425075 | A | 12/2017 |
| CN | 110854135 | A | 2/2020 |
| JP | 2009229890 | A | 10/2009 |

* cited by examiner

105 —

1061

1061

1071&
1072

103

1064

107 —

110

1041

104

2032          2031

DISPLAY SUBSTRATE, DISPLAY PANEL AND DISPLAY DEVICE

CROSS REFERENCE TO RELATED APPLICATIONS

The present application is a National Stage of International Application No. PCT/CN2022/135621, filed on Nov. 30, 2022, the entire contents of which are incorporated by reference in the present application.

TECHNICAL FIELD

The disclosure herein relates to the field of display technology, especially relates to a display substrate, a display panel and a display device.

BACKGROUND

With the continuous development of display technology, users have higher and higher requirements for display resolution (PPI). Since the gradual rise of three-dimensional (3D) display technologies such as virtual reality (VR) and augmented reality (AR) are near-eye displays, in order to better immerse the experience and reduce the screen door effect in the use of VR products and AR products, higher requirements are put forward for the PPI of VR products and AR products.

SUMMARY

The present disclosure provides a display substrate, a display panel and a display device. The specific solutions are as following.

In one aspect, some embodiments of the present disclosure provide a display substrate including: a first base substrate; a first polarizer located on a side of the first base substrate; and a data line located on a side, away from the first polarizer, of the first base substrate, and an extension direction of the data line is substantially perpendicular to an absorption axis of the first polarizer.

In some embodiments, in the display substrate of the present disclosure, the display substrate is applied to a liquid crystal display panel, and a ratio of a thickness of the data line in a direction perpendicular to the first base substrate to a cell gap of the liquid crystal display panel is greater than or equal to 0.14 and less than or equal to 0.27.

In some embodiments, the display substrate of the present disclosure further include: an interlayer dielectric layer located on a side, away from the first base substrate, of a layer where the data line is located, the interlayer dielectric layer includes at least one interlayer dielectric sub-layer, and a sum of a product of a refractive index and a thickness of each interlayer dielectric sub-layer is an integer multiple of $\lambda/4$.

In some embodiments, in the display substrate of the present disclosure, a slope angle of the data line is $\alpha$, tan $\alpha=a*b$, wherein a is greater than or equal to 2.66, and b is the cell gap of the liquid crystal display panel.

In some embodiments, in the display substrate of the present disclosure, the slope angle $\alpha$ of the data line is greater than 75° and less than 90°.

In some embodiments, the display substrate of the present disclosure further includes: a common electrode, the common electrode is located on a side, away from the first base substrate, of the layer where the data line is located, the common electrode includes a slit, and an angle between an extension direction of the slit and the absorption axis of the first polarizer is greater than or equal to 80° and less than or equal to 100°.

In some embodiments, the display substrate of the present disclosure further includes: a light-shielding structure and a transistor, the transistor includes an active layer located between the layer where the data line is located and the first base substrate, and the light-shielding structure is located between the active layer and the first base substrate; the active layer includes a first portion extending in a direction of the absorption axis of the first polarizer, a distance between the first portion and the light-shielding structure in the extension direction of the data line is $d_1$, $d_1=c*(L/W)$, wherein c is greater than 0.446 and less than 2.08, L is a length of the pixel opening region along the extension direction of the data line, and W is a width of the light-shielding structure along the extension direction of the data line.

In some embodiments, in the display substrate of the present disclosure, the transistor includes a first electrode on a side, away from the first base substrate, of the layer where the data line is located, the display substrate further includes an insulating layer between the active layer and the first electrode, the first electrode is electrically connected with the active layer by a via hole penetrating through the insulating layer, an aperture of the via hole gradually increases in a direction that the insulating layer is away from the first base substrate, and an aperture of a bottom opening, facing the first base substrate, of the via hole is d; and the active layer further includes a second portion extending in the extension direction of the data line, an orthographic projection of the second portion on the first base substrate and an orthographic projection of the data line on the first base substrate do not overlap with each other, the second portion is integrally arranged with the first portion, a distance between one end, away from the first portion, of the second portion and the via hole in the extension direction of the data line is $d_2$, and $d_2/d$ is greater than or equal to 0.4 and less than or equal to 1.

In another aspect, some embodiments of the present disclosure provide a display panel, including: a display substrate and an opposite substrate opposite to the display substrate, and a liquid crystal layer between the display substrate and the opposite substrate, wherein the display substrate is the display substrate as described in any one of above embodiments, the opposite substrate includes a second base substrate and a second polarizer arranged on a side, away from the liquid crystal layer, of the second base substrate, and an absorption axis of the second polarizer is substantially parallel to the extension direction of the data line.

In some embodiments, in the display panel of the present disclosure, the opposite substrate further includes a black matrix arranged on a side, facing the liquid crystal layer, of the second base substrate, the black matrix includes a first black matrix strip extending along the absorption axis of the first polarizer, and an orthographic projection of the first black matrix strip on the first base substrate is located in an orthographic projection of the light-shielding structure on the first base substrate.

In some embodiments, in the display panel of the present disclosure, the black matrix further includes a second black matrix strip extending along the extension direction of the data line and being arranged in a layer different from a layer where the first black matrix strip is, and an orthographic projection of the second black matrix strip on the first base substrate covers the orthographic projection of the data line on the first base substrate.

In some embodiments, the display panel of the present disclosure further includes: a display region and a dummy region surrounding the display region, the black matrix further includes a black matrix block arranged in a single layer on an entire surface of the dummy region, the first black matrix strip and the second black matrix strip are located in the display region, and the first black matrix strip and the second black matrix strip include a widened portion at an overlapping position where the first black matrix strip and the second black matrix strip overlap with each other; the opposite substrate further includes a color resistance layer located on a side, facing the liquid crystal layer, of a layer where the black matrix is located, the color resistance layer includes a first color resistance strip located in the display region and a second color resistance strip located in the dummy region, and the first color resistance strip and the second color resistance strip each extend along the extension direction of the data line; the first color resistance strip fills a grid defined by the first black matrix strip and the second black matrix strip and covers the first black matrix strip and the second black matrix strip, a thickness of the first color resistance strip at the grid defined by the first black matrix strip and the second black matrix strip is greater than a thickness of the first color resistance strip at the widened portion and is greater than a thickness of the second color resistance strip, and the thickness of the first color resistance strip at the widened portion is less than the thickness of the second color resistance strip.

In some embodiments, in the display panel of the present disclosure, the opposite substrate further includes a spacer and a first auxiliary spacer which are on a side, facing the liquid crystal layer, of the color resistance layer and arranged in one layer; wherein an orthographic projection of the spacer on the first base substrate is located in an orthographic projection of the widened portion on the first base substrate, and an orthographic projection of the first auxiliary spacer on the first base substrate is located in an orthographic projection of the second color resistance strip on the first base substrate.

In some embodiments, in the display panel of the present disclosure, the first color resistance strip includes a red color resistance strip, the orthographic projection of the widened portion on the first base substrate is penetrated by an orthographic projection of the red color resistance strip on the first base substrate, and an orthographic projection of the spacer on the first base substrate overlaps the orthographic projection of the red color resistance strip on the first base substrate.

In some embodiments, in the display panel of the present disclosure, the black matrix block, the first black matrix strip and the second black matrix strip are arranged in one layer.

In some embodiments, in the display panel of the present disclosure, a thickness of the black matrix block is equal to a thickness of the first black matrix strip, or a thickness of the second black matrix strip.

In some embodiments, in the display panel of the present disclosure, the display substrate includes a support layer on a side, away from the first base substrate, of the common electrode, the support layer includes a first boss in the display region, and an area of a surface, facing the liquid crystal layer, of the first boss is less than an area of a surface, facing the liquid crystal layer, of the spacer.

In some embodiments, in the display panel of the present disclosure, the display substrate includes a support layer on a side, away from the first base substrate, of the common electrode, the support layer includes a first boss in the display region, the spacer includes a main spacer and a second auxiliary spacer, and in a direction perpendicular to the first base substrate, a height of the first boss is greater than a difference between a height of the main spacer and a height of the second auxiliary spacer.

In some embodiments, in the display panel of the present disclosure, a height of the first auxiliary spacer is substantially same as the height of the second auxiliary spacer.

In some embodiments, in the display panel of the present disclosure, the supporting layer further includes a second boss in the dummy region, and a distance between a surface, facing the liquid crystal layer, of the second boss and the first base substrate is greater than a distance between a surface, facing the liquid crystal layer, of the first boss and the first base substrate.

In some embodiments, the display panel of the present disclosure further includes a protective layer located between the color resistance layer and a layer where the spacer is, and a thickness of the protective layer in the display region is less than a thickness of the protective layer in the dummy region.

In another aspect, some embodiments of the present disclosure provide a display device, including a backlight module and a display panel arranged on a light emergent side of the backlight module, wherein the display panel is a display panel as described in any one of above embodiments.

DETAILED DESCRIPTION

Figure 1:
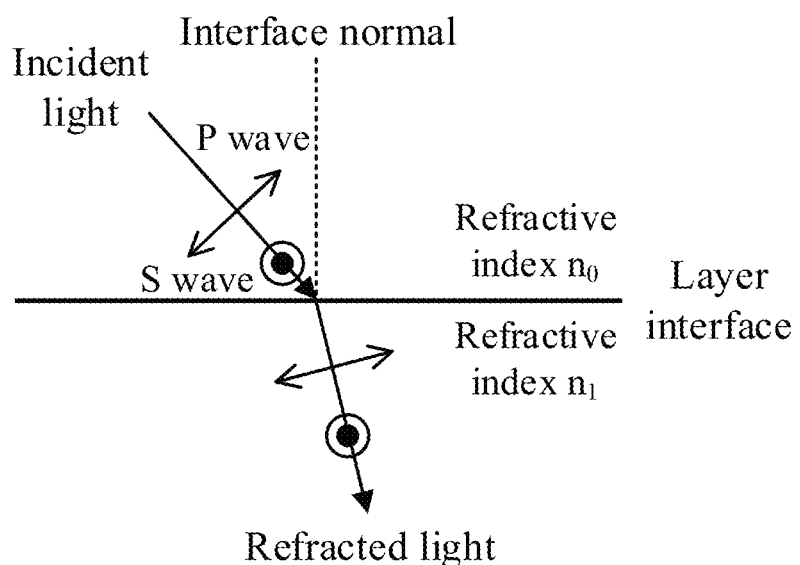
FIG. 1 is a schematic diagram of light propagation.

In order to make the purpose, technical solution and advantages of embodiments of the present disclosure clearer, the technical solutions of the embodiments of the present disclosure will be clearly and completely described below in conjunction with the accompanying drawings of the embodiments of the present disclosure. It should be noted that in the attached drawings, for clarity, the thickness of layers, films, panels, regions, etc., is enlarged. In the present disclosure, an exemplary embodiment is described with reference to a cross-sectional view of the schematic diagram that is an idealized embodiment. In this way, deviations from the shape of the diagram are expected as a result of, for example, manufacturing techniques and/or tolerances. Accordingly, the embodiments described in the present disclosure should not be construed as being limited to the specific shape of the region as shown in the present disclosure, but rather as including deviations in the shape caused by, for example, manufacture. For example, a region that is illustrated or described as flat can typically have rough and/or non-linear features. The sharp corners shown can be round, etc. Therefore, the regions shown in the diagram are inherently indicative in nature, and their dimensions and shapes do not intend to be the exact shape of the illustrated regions and do not reflect true proportions, and are intended to illustrate the contents of this disclosure only. The same or similar designation at all times indicates the same or similar element or component with the same or similar function. In order to keep the following descriptions of the embodiments of the present disclosure clear and concise, the detailed descriptions of known functions and known parts are omitted.

Unless otherwise defined, the technical or scientific terms used herein shall have the meaning in their ordinary sense as understood by persons of general skill in the field to which the disclosure belongs. The use of the words "first", "second" and similar terms in this disclosure statement and in the claims does not indicate any order, quantity or importance, but merely serves to distinguish the different components. Words such as "include" or "include" mean that the element or object that precedes the word includes the element or object listed after the word and its equivalents, and does not exclude other elements or objects. Similar terms such as "connect" or "link" are not limited to physical or mechanical connections, but may include electrical connections, whether direct or indirect. "Inside", "Outside", "Up", "Down", etc., are only used to indicate a relative positional relationship, and when the absolute position of the described object changes, the relative positional relationship may also change accordingly.

In the following description, when a component or layer is said to be "on" or "connected to" another component or layer, the component or layer may be directly on the other component or layer, directly connected to the other component or layer, or an intermediate element or layer may exist. When a component or layer is said to be "set on one side of another component or layer", the component or layer can be directly connected to the other component or layer directly on one side of the other component or layer, or an intermediate element or layer may exist. However, when a component or layer is said to be "directly on" another component or layer, or "directly connected to" another component or layer, there is no intermediate component or layer. The term "and/or" includes any and all combinations of one or more related listed items.

As used in this disclosure, the words "approximately" or "substantially" include the stated values and imply an acceptable deviation from a specific value as determined by a person skilled in the art with regard to the measurement in question and the errors associated with the measurement of a specific quantity (i.e., the limitations of the measurement system). For example, "approximately" can mean that the difference from the stated value is within one or more standard deviations (e.g., ±10%).

Figure 2:
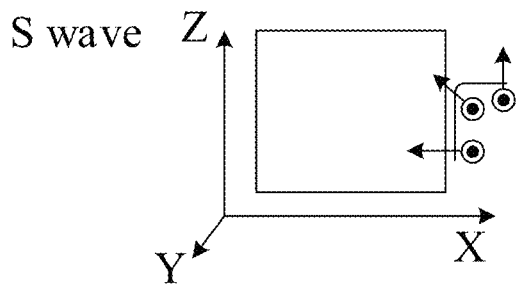
FIG. 2 is a schematic diagram of a relationship between a vibration direction of a S wave and a direction of a wave vector.
Figure 3:
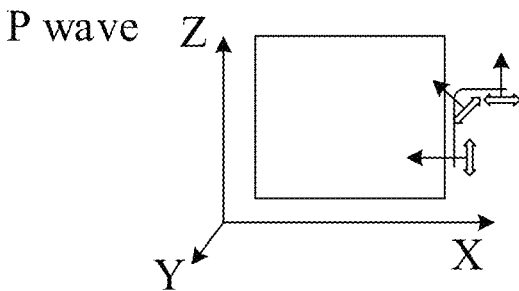
FIG. 3 is a schematic diagram of a relationship between a vibration direction of a P wave and a direction of a wave vector.

FIG. 1 is a schematic diagram of light propagation. FIG. 2 is a schematic diagram of a relationship between the vibration direction of the S wave and the direction of the wave vector, and FIG. 3 is a schematic diagram of a relationship between the vibration direction of the P wave and the direction of the wave vector. As shown in FIG. 1, the incident light, the refracted light, and the interface normal are in the same plane. The vibration direction of the S wave is perpendicular to the plane, and the vibration direction of the P wave is in the plane and is perpendicular to the vibration direction of the S wave. As shown in FIG. 2 and FIG. 3, if the plane of incident light, refracted light, and the interface normal is the X-Z plane, the wave the vibration direction of which is in this plane is the P wave, and the wave the vibration direction of which is in the Y axis direction is the S wave. As shown in FIG. 2, the initial vibration direction of the S wave is the Y direction, and in the process of the vector direction of the S wave gradually changing from the X direction to the Z direction, the vibration direction of the S wave is always only the Y direction. As shown in FIG. 3, the initial vibration direction of the P wave is the Z direction, but in the process of the vector direction of the P wave gradually changing from the X direction to the Z direction, the vibration direction of the P wave is increased by the X direction on the basis of the Z direction. Therefore, when the propagation direction of light changes, the polarization direction of the S wave does not change, and the polarization direction of the P wave changes.

Figure 4:
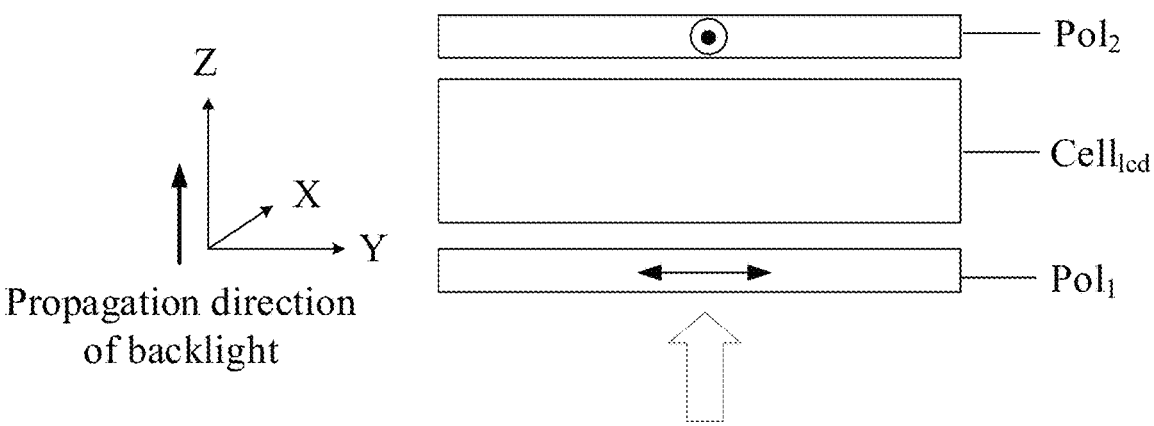
FIG. 4 is a schematic diagram of a propagation of a backlight through a liquid crystal panel.
Figure 5:
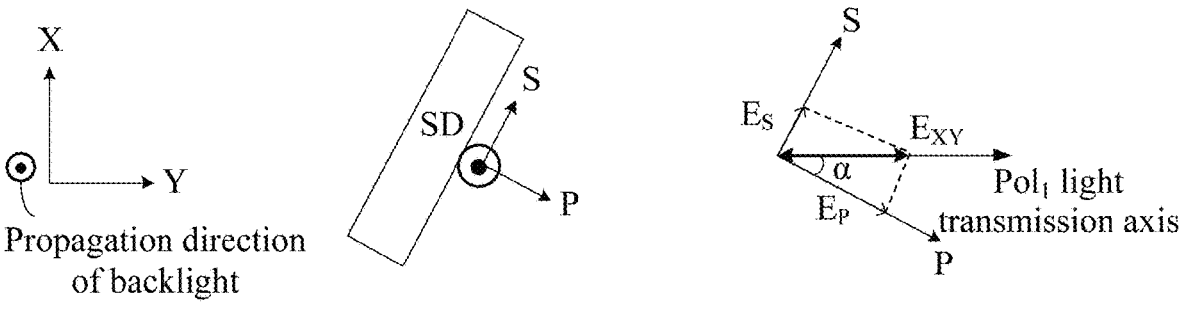
FIG. 5 is a schematic diagram of a wave vector before the backlight passes through a lower polarizer to a data line.
Figure 6:
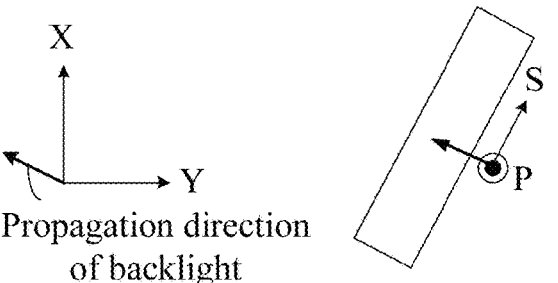
FIG. 6 is a schematic diagram of the wave vector after the backlight passes through the data line.
Figure 6:
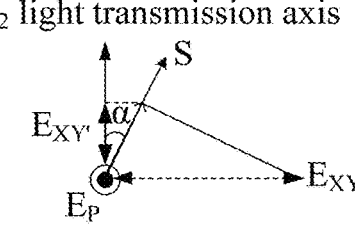

FIG. 4 is a schematic diagram of the propagation of the backlight through the liquid crystal panel. FIG. 5 is a schematic diagram of the wave vector before the backlight passes through the lower polarizer (Pol$_1$) to the data line (SD). FIG. 6 is a schematic diagram of the wave vector after the backlight passes through the data line (SD). As shown in FIGS. 4 to 6, the liquid crystal panel includes a lower polarizer (Pol$_1$) on the light incident side, an upper polarizer (Pol$_2$) on the light emergent side, and a liquid crystal cell (Cell$_{lcd}$) between the lower polarizer (Pol$_1$) and the upper polarizer (Pol$_2$), with the angle between the light transmission axis of the lower polarizer (Pol$_1$) and the Y-axis being 0°, and the angle between the light transmission axis of the upper polarizer (Pol$_2$) and the Y-axis being 90° and the angle between the light transmission axis of the upper polarizer (Pol$_2$) and the X-axis being 0°. The angle between the data line(s) (SD) in the liquid crystal cell (Cell$_{lcd}$) and the X-axis is α. When the linear polarization light E$_{XY}$ passing through the lower polarizer (Pol$_1$) encounters the data line (SD), a straight-edge diffraction of the linear polarization light E$_{XY}$ occurs, resulting in a change in the direction of light propagation, which is manifested as the P wave(s) becoming in a vertical direction (i.e., perpendicular to the XY plane where the liquid crystal panel is located), and there is only an S wave(s) in the XY plane, and the S wave can be decomposed to the depolarization component E$_{XY'}$ in the direction of the light transmission axis of the upper polarizer (Pol$_2$), so that the depolarization component E$_{XY'}$ can produce light leakage through the upper polarizer (Pol$_2$). According to the formula E$_{XY'}$=E$_{XY}$*cos α*sin α=½*Exy* sin 2α, when the α is 45°, E$_{XY'}$ is the largest resulting the most serious light leakage.

Moreover, with the continuous improvement of resolution, the difficulty of product design and process is also increasing. In order to pursue high aperture ratio and high transmittance, as shown in FIG. 7, the data line (SD) in related art is tilted by 80° relative to the absorption axis (aperture ratio the X-axis) of the lower polarizer (Pol$_1$) (aperture ratio α=45°), and the density of the data lines (SD) is getting higher and higher, resulting in more and more serious light leakage in the conventional pixel design under the black screen, so how to improve the light leakage defect caused by the data line (SD) becomes the key to improving contrast.

In order to improve the above-mentioned technical problems existing in the related art, an embodiment of the present disclosure provides a display substrate, as shown in FIG. 8 to FIG. 19, includes: a first base substrate 101; a first polarizer 102 (i.e., the lower polarizer Pol$_1$) on one side of the first base substrate 101; a data line(s) 103 on one side of the first base substrate 101 away from the first polarizer 102, and the extension direction of the data line 103 (which equivalent to the above-mentioned Y-axis) is substantially perpendicular to the absorption axis of the first polarizer 102 (aperture ratio the above-mentioned X-axis), that is, it is perpendicular or within the error range of ±5% caused by factors such as production and measurement.

In the above-mentioned display substrate provided in the embodiment of the present disclosure, by setting the extension direction of the data line 103 (aperture ratio the above-mentioned Y-axis) to be substantially perpendicular to the absorption axis (aperture ratio the above-mentioned X-axis) of the first polarizer 102, the angle α between the data line 103 and the X-axis is substantially 90°. Combined with the formula of the depolarization component Ex that cannot be absorbed by the upper polarizer Pol$_2$: E$_{XY'}$=E$_{XY}$*cos α*sin α=½*Exy*sin 2α, it can be seen that the depolarization component E$_{XY'}$ is 0. Therefore, the depolarization component E$_{XY'}$ that causes light leakage will not be produced by adopting the scheme of the present disclosure, which effectively solves the light leakage problem caused by the data line 103 and improves the contrast.

Figure 7:
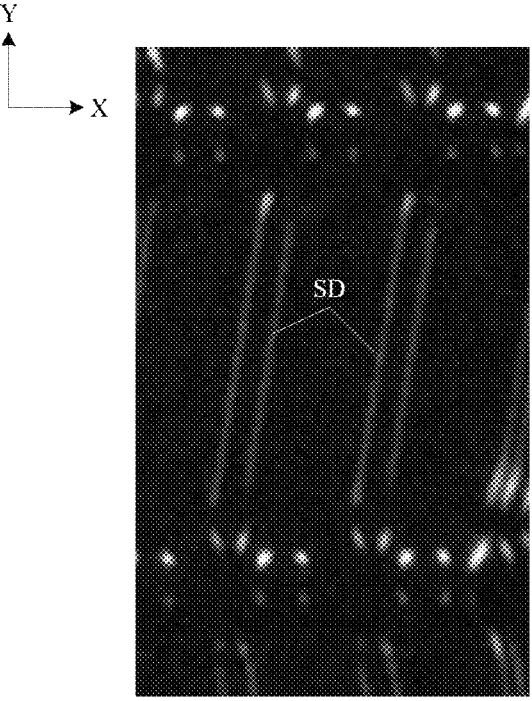
FIG. 7 is a schematic diagram of an actual effect of light leakage caused by the data line.
Figure 8:
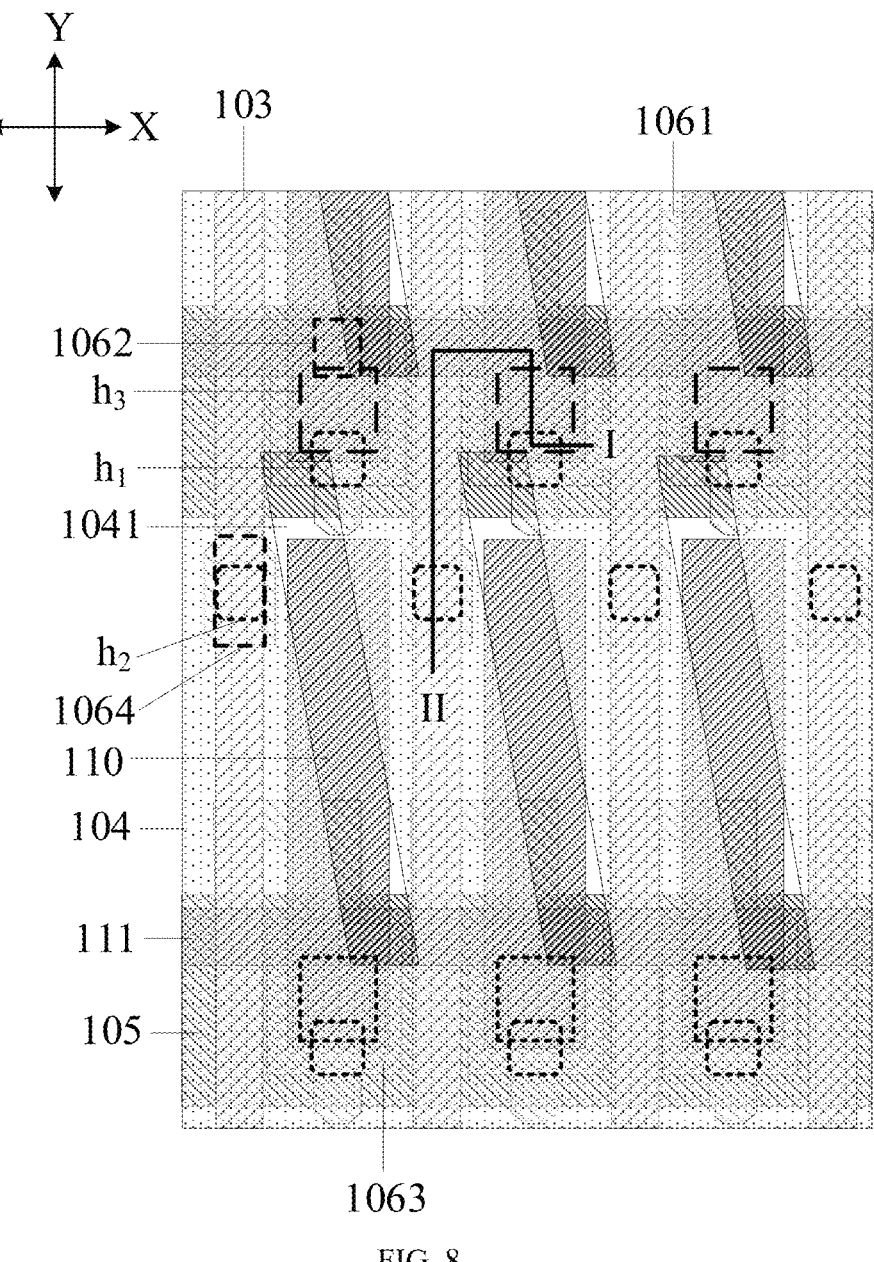
FIG. 8 is a structural schematic diagram of a display substrate provided in an embodiment of the present disclosure.

In addition, because the data line (SD) in the related art shown in FIG. 7 is obliquely arranged, and the data line 103 is approximately "V-shaped" in the tilt direction of adjacent pixel regions in the Y direction, the data line 103 is actually made to be similar to the block-like morphology such as semi-ellipse and U-shaped at the corner position of the "V-shaped", and the size (CD) of the black matrix in the region is increased in order to cover this part, and the aperture ratio is reduced. In the present disclosure, the data line 103 extends along the direction substantially perpendicular to the absorption axis (which equivalent to the above-mentioned X-axis) of the first polarizer 102, and the difficulty of process control is reduced, and the aperture ratio can be increased by about 3%.

In some embodiments, the display substrate provided in the embodiment of the present disclosure may be applied to a liquid crystal display panel, and the ratio of the thickness of the data line(s) 103 in a direction perpendicular to the first base substrate 101 to the cell gap of the liquid crystal display panel may be greater than or equal to 0.14 and less than or equal to 0.27, for example, greater than or equal to 0.18 and less than or equal to 0.23. The cell gap of the liquid crystal display panel is the sum of the thickness of alignment film of the display substrate, the thickness of the liquid crystal layer, and the thickness of alignment film of the opposite substrate. In some embodiments, the cell gap of the liquid crystal display panel is greater than or equal to 1.4 μm and less than or equal to 2 μm, for example, it can be greater than or equal to 1.4 μm and less than or equal to 1.8 μm, e.g., 1.4 μm, 1.5 μm, 1.6 μm, 1.7 μm, or 1.8 μm, etc. The thickness of the data line 103 in a direction (corresponding to the Z-axis) perpendicular to the direction of the first base substrate 101 may be greater than or equal to 2800 Å and less than or equal to 3800 Å, e.g., 2800 Å, 2900 Å, 3000 Å, 3100 Å, 3200 Å, 3300 Å, 3400 Å, 3500 Å, 3600 Å, 3700 Å, or 3800 Å and so on. The thickness of the data line 103 in the related art is thicker, e.g., 5500 Å. In the present disclosure, the thickness of the data line 103 is thinned to be in a range of 2800 Å~3800 Å. The data line 103 includes a side surface extending along its extension direction (which equivalent to the above-mentioned Y-axis), and a bottom surface towards the first base substrate 101. Under the condition that the angle between the side surface and the bottom surface is an acute angle and the bottom surface area is unchanged, the area of the side surface can be reduced by thinning the thickness of the data line 103. In this way, the reflected light of the backlight on the side surface is reduced, and the light leakage defect is improved. Moreover, the data line 103 that meets the above proportion and thickness range can also have good conductivity.

Figure 9:
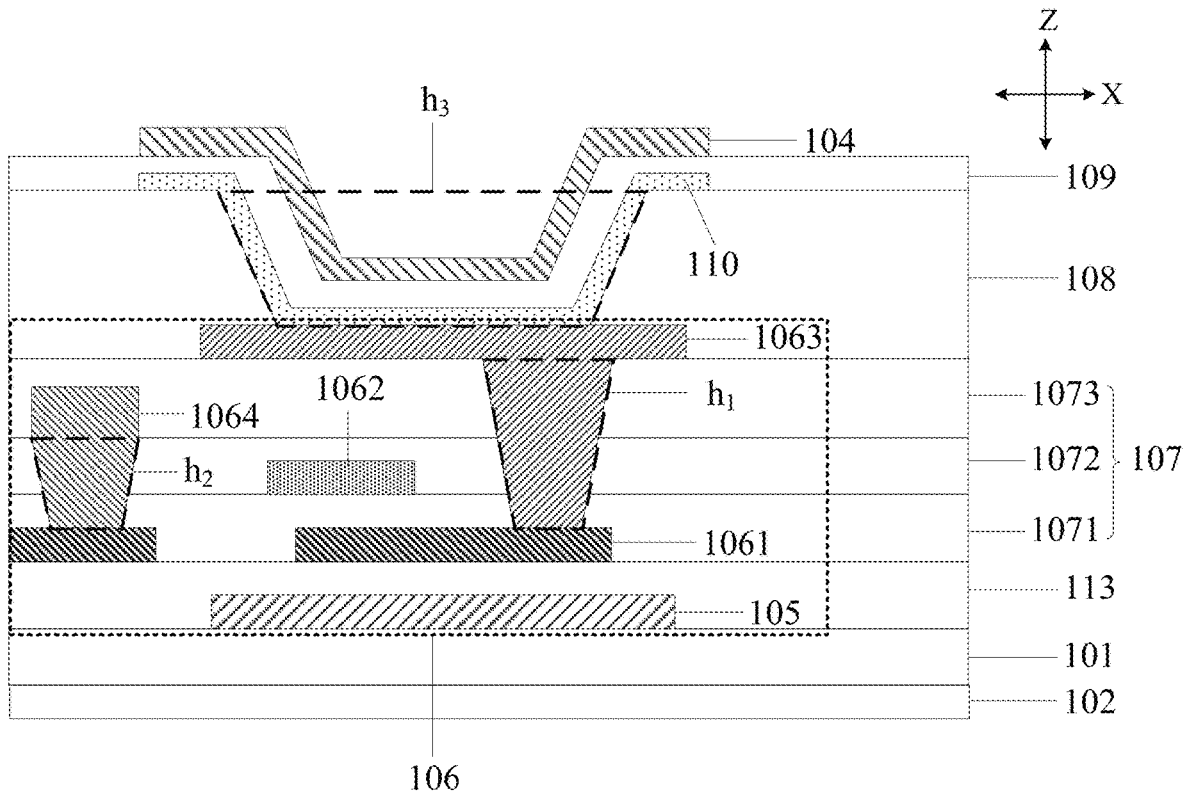
FIG. 9 is a cross-sectional view along a line I-II in FIG. 8.
Figure 10:
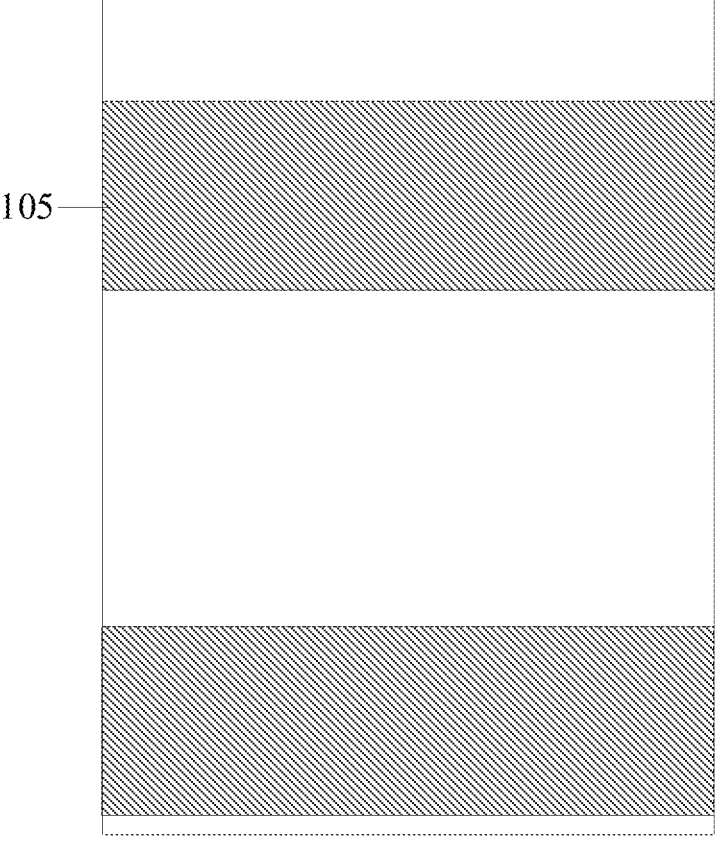
FIG. 10 is a schematic diagram of a light-shielding structure in FIG. 8.
Figure 11:
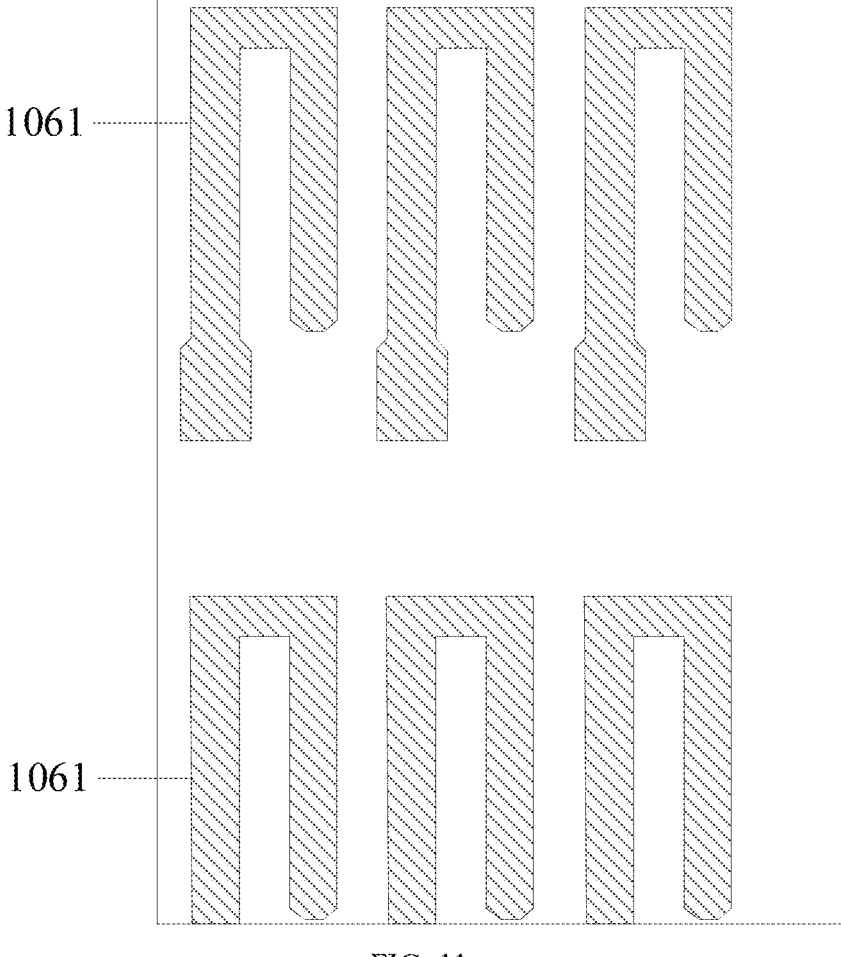
FIG. 11 is a schematic diagram of an active layer in FIG. 8.
Figure 12:
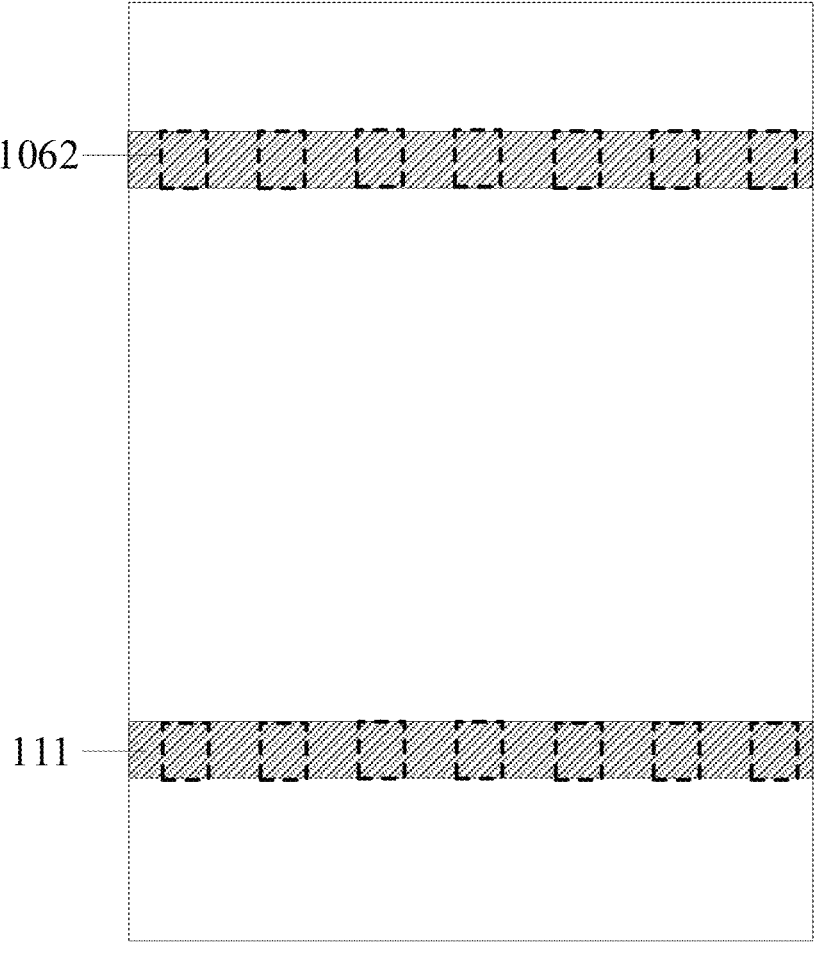
FIG. 12 is a schematic diagram of gate lines in FIG. 8.
Figure 13:
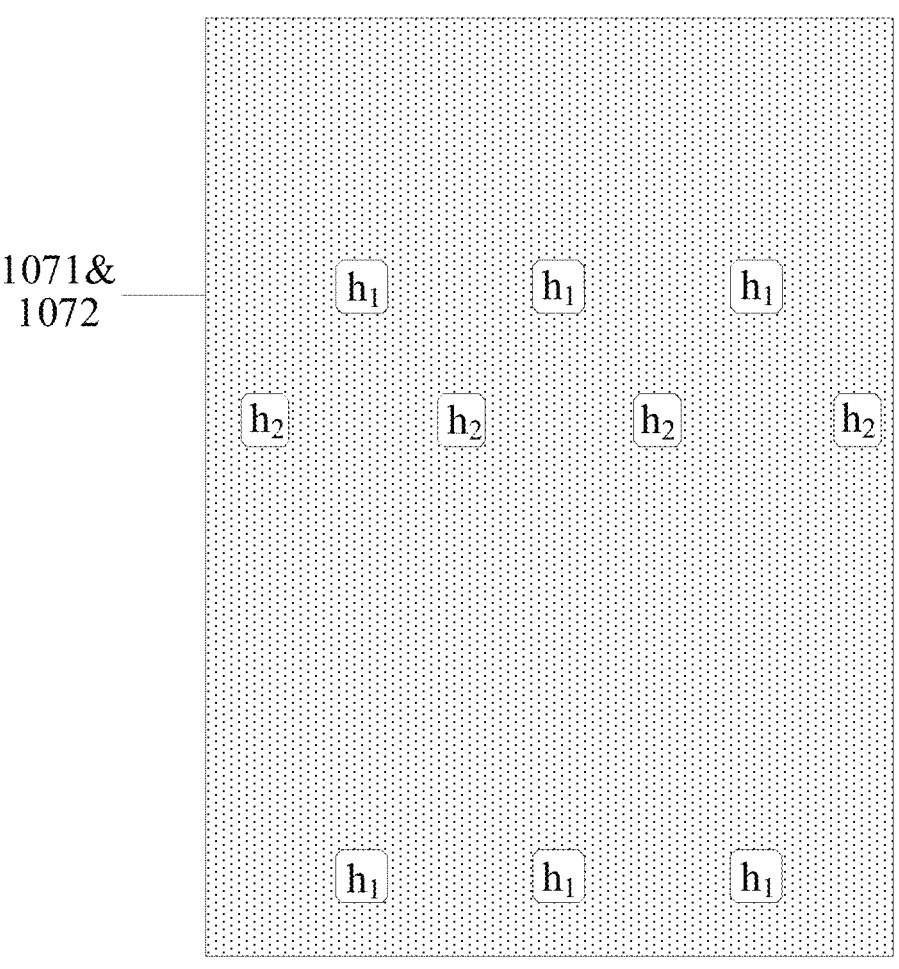
FIG. 13 is a schematic diagram of a gate insulation layer and a first interlayer dielectric layer in FIG. 8.
Figure 14:
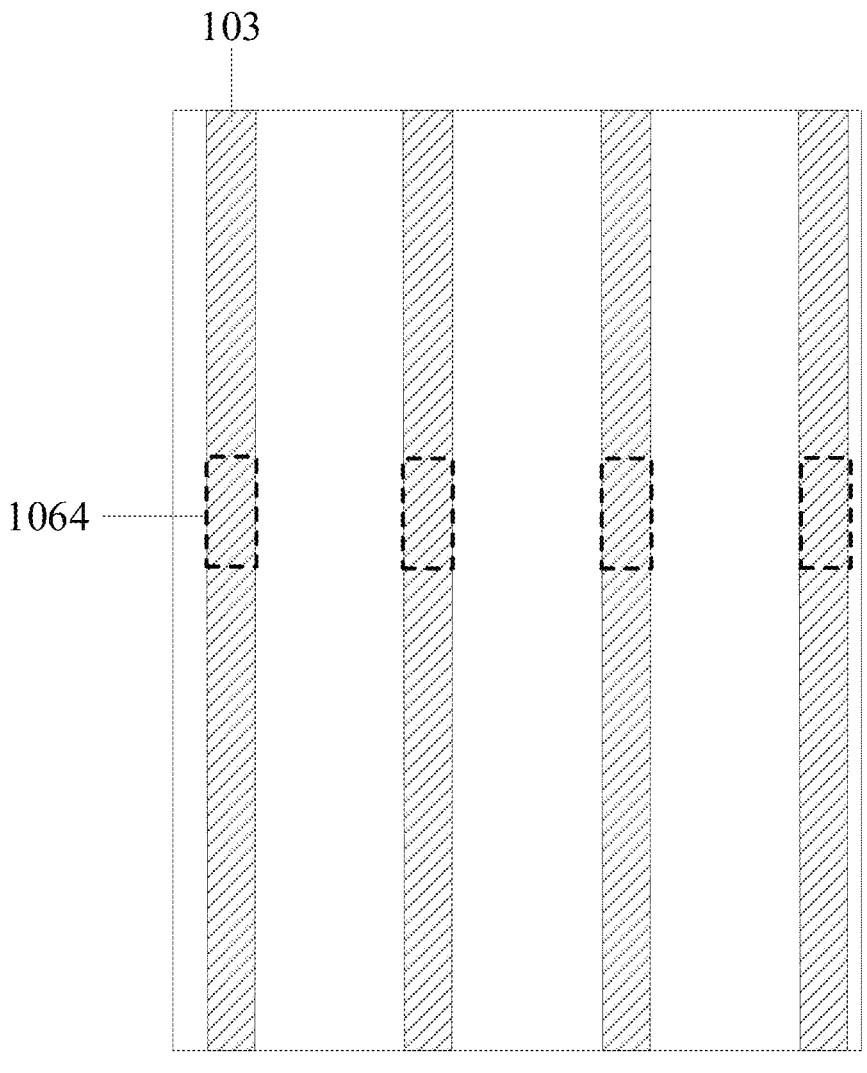
FIG. 14 is a schematic diagram of data lines in FIG. 8.
Figure 15:
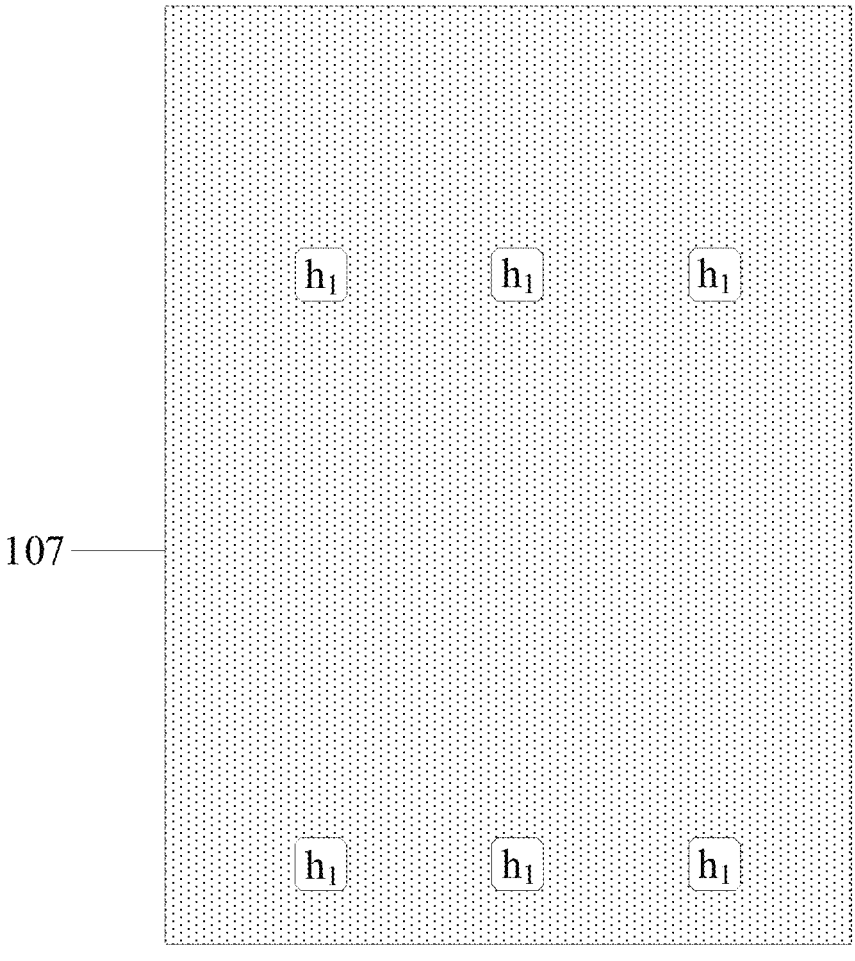
FIG. 15 is a schematic diagram of a second interlayer dielectric layer in FIG. 8.
Figure 16:
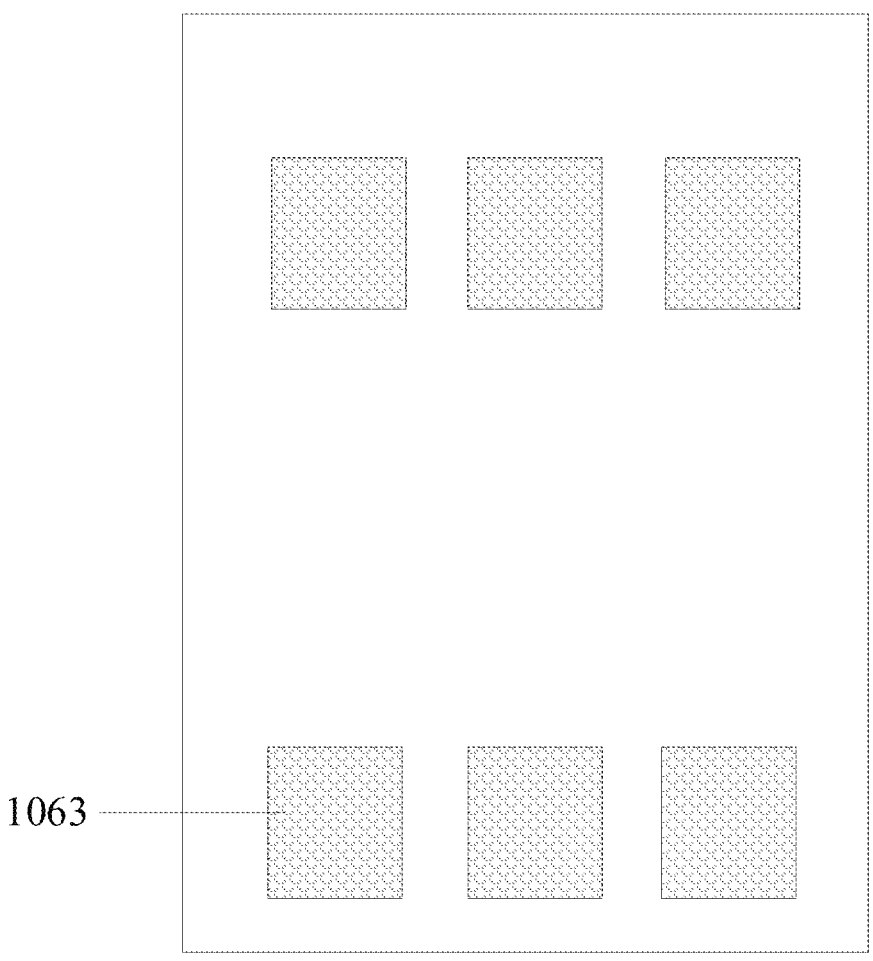
FIG. 16 is a schematic diagram of a first electrode(s) in FIG. 8.
Figure 17:
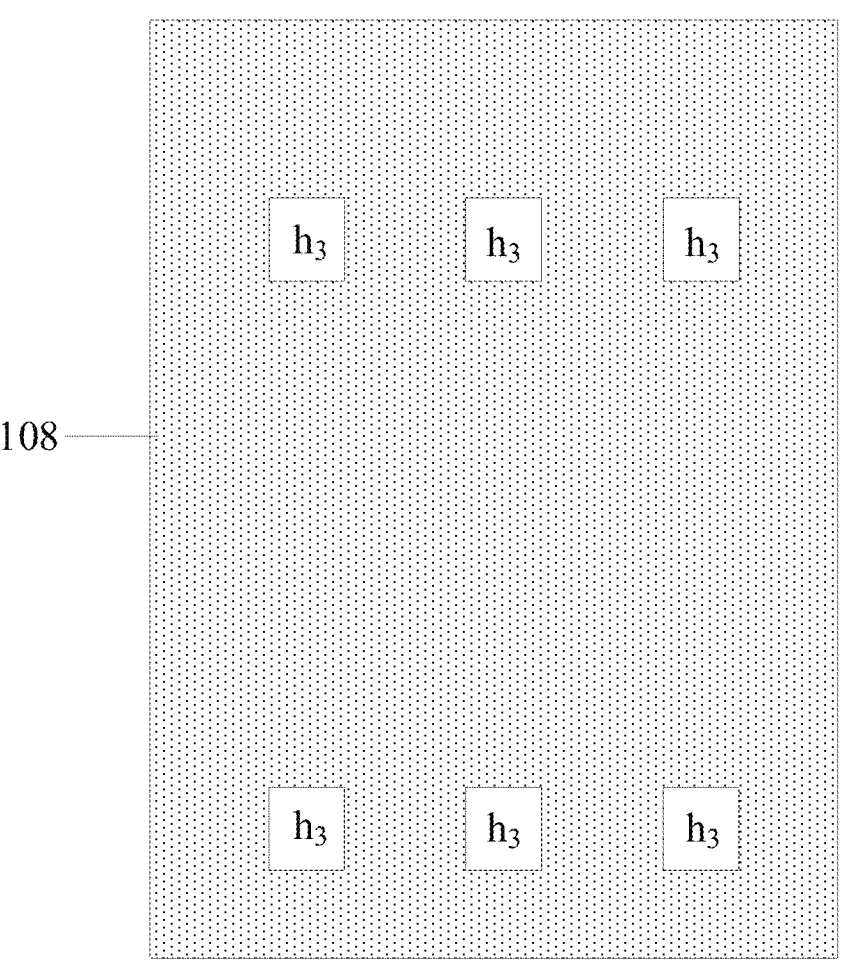
FIG. 17 is a schematic diagram of a planarization layer in FIG. 8.
Figure 18:
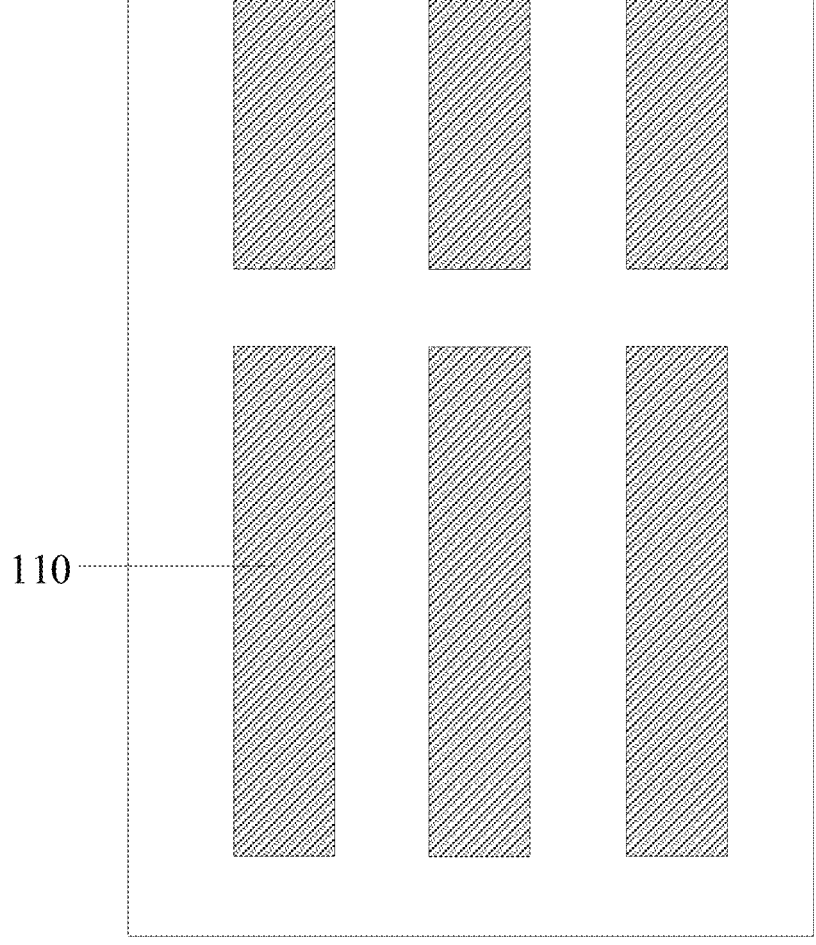
FIG. 18 is a schematic diagram of a pixel electrode(s) in FIG. 8.
Figure 19:
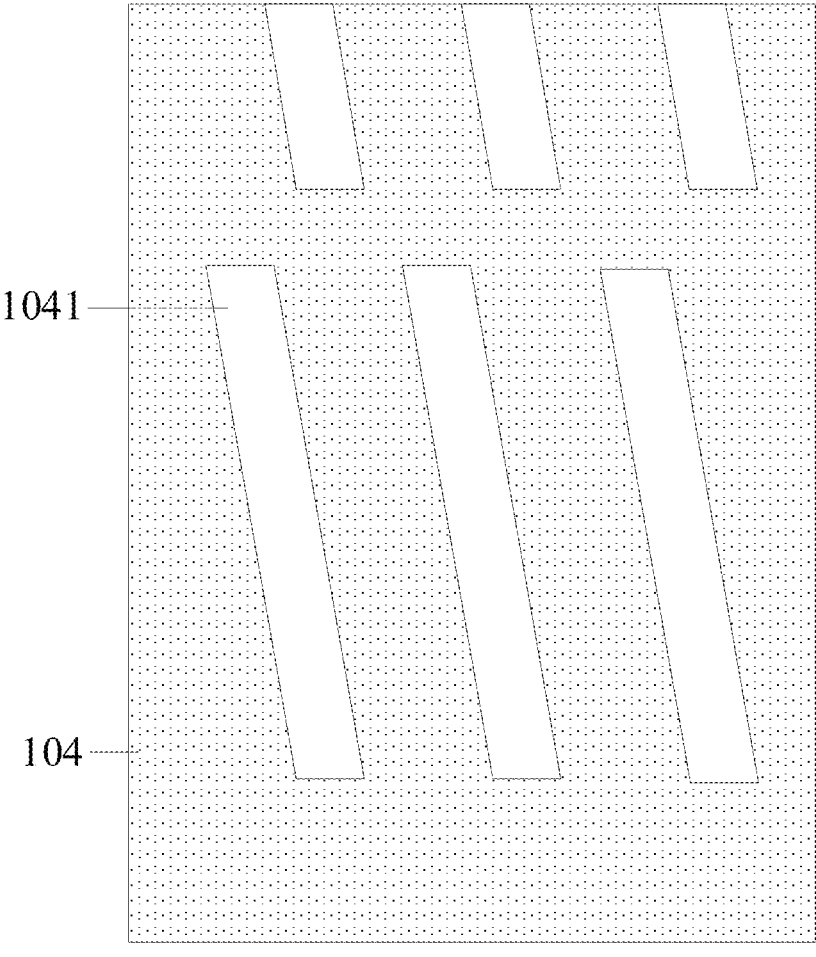
FIG. 19 is a schematic diagram of a common electrode in FIG. 8.

In some embodiments, the display substrate provided by the present disclosure, as shown in FIG. 9, further includes an interlayer dielectric layer (i.e., a second interlayer dielectric layer 1073) located on a side, away from the first base substrate 101, of a layer (which equivalent to the layer where the second electrode 1064 of the transistor 106 is located) where the data line 103 is located. The interlayer dielectric layer (i.e., a second interlayer dielectric layer 1073) includes at least one interlayer dielectric sub-layer (e.g., including a silicon nitride layer, a silicon oxide layer, and a silicon nitride layer arranged in a stacked manner). The sum of the products (i.e., optical path) each of which is the refractive index and thickness of each sub-interlayer (e.g., the silicon nitride layer, the silicon oxide layer, and the silicon nitride layer) is an integer multiple of $\lambda/4$. This arrangement is mainly to consider the refractive index and thickness between the film layers, and the inventor found that when the sum of the optical paths of the respective film layers reaches an integer multiple of $\lambda/4$, the reflectivity between the film layers will be reduced and the transmittance can be increased.

In some embodiments, in the display substrate provided in the present disclosure, the slope angle of the data line 103 (i.e., the angle between the side surface and the bottom surface of the data line 103) is $\alpha$, $\tan\alpha = a*b$. Wherein a is greater than or equal to 2.66, for example, a is greater than or equal to 4.05, for example, a can be 6.72; and b is the cell gap of the liquid crystal display panel. The slope angle $\alpha$ of the data line 103 can be greater than 75° and less than 90°, for example, it can be greater than or equal to 78° and less than or equal to 85°, for example, it is 76°, 78°, 80°, 82°, 85°, or 88°, etc. The slope angle of the data line 103 in the related art is 75°, and in the present disclosure the area of side surface of the data line 103 can be reduced by increasing the slope angle of the data line 103, thereby reducing the reflected light of the backlight on the side surface and improving the light leakage defect.

In some embodiments, the display substrate provided in the present disclosure, as shown in FIG. 8 to FIG. 19, further includes a common electrode 104. The common electrode 104 is located on one side of the layer where the data line 103 is located away from the first base substrate 101, and the common electrode 104 includes a slit(s) 1041. The angle between the extension direction of the slit 1041 and the absorption axis (which equivalent to the X-axis) of the first polarizer 102 is greater than or equal to 80° and less than or equal to 100°. Since the angle, i.e., the incident polarizing angle (the angle varies according to the needs of different products, and is generally about 10° for VR products), need to be designed between the alignment direction (which equivalent to the absorption axis direction of the upper polarizer Pol₂) of the liquid crystal and the slit 1041 of the common electrode 104 to ensure that the liquid crystal molecules rotate in one direction. When the slit 1041 of the common electrode 1044 is changed from a conventional vertical design to an inclination of 80°~100° relative to the absorption axis of the first polarizer 102, the absorption axis of the second polarizer (i.e., the upper polarizer Pol₂) in the opposite substrate can be angled 90° with the absorption axis of the first polarizer 102. At this moment, the absorption axis of the second polarizer (i.e., the upper polarizer Pol₂) is parallel to the extension direction (which equivalent to the Y-axis) of the data line 103, so that the light leakage at the edge of the data line 103 can be blocked to the greatest extent by the second polarizer (i.e., the upper polarizer Pol₂), the brightness of the L0 gray scale is reduced, and the contrast is improved.

Figures 20, 21:
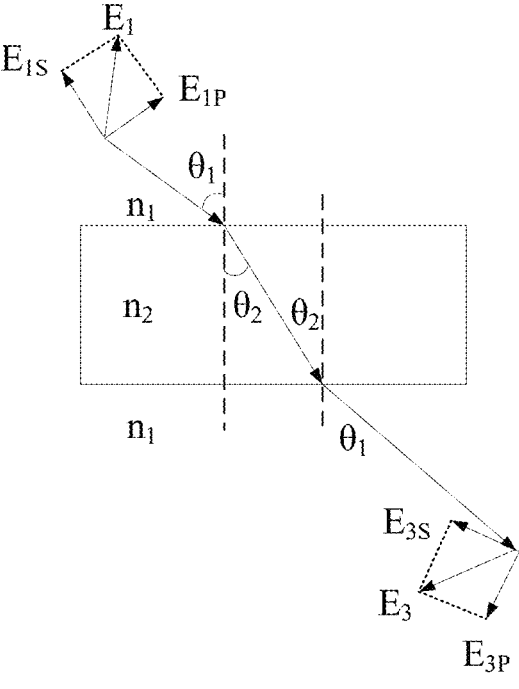
FIG. 20 is a schematic diagram of a propagation of P waves and S waves among layer interfaces.
FIG. 21 is a morphology of the active layer.
Figure 22:
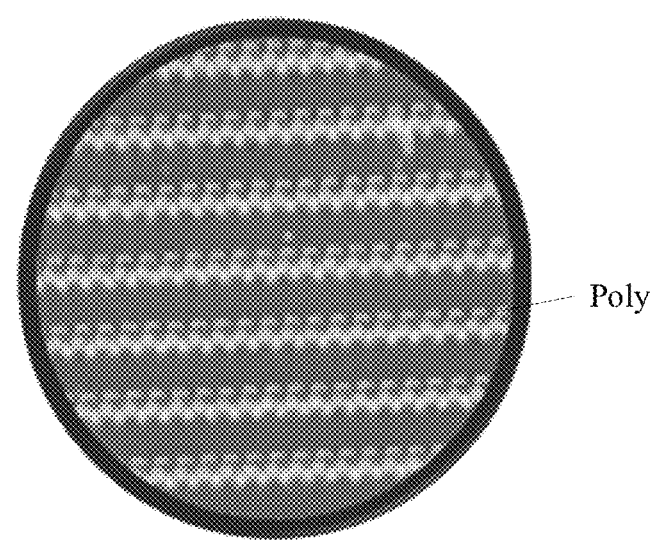
FIG. 22 is a schematic diagram of an actual effect of light leakage caused by the active layer.

FIG. 20 is a schematic diagram of the propagation of P wave and S wave among the film layer interfaces. The P wave and S wave are calculated by combining FIG. 10 and Fresnel's formula to satisfy: $E_{3s} = \cos^2(\theta_2 - \theta_1)E_{3p}$, $\tan\phi' = \cos^2(\theta_2 - \theta_1)$, where the active layer (poly) is a high refractive film layer (n>4), the interlayer dielectric layer (n≈1.5) is above the active layer (poly). Since the surface of the active layer (poly) is uneven (as shown in FIG. 21), and the backlight is almost perpendicularly incident to the active layer (poly), a non-perpendicular incidence (i.e., $\theta_2 \neq \theta_1$) is formed between the active layer (poly) and the interlayer dielectric layer after the interlayer dielectric layer is plated on the active layer (poly). As a result, the state of the polarized light changes, and the upper polarizer (Pol₂) is unable to absorb the light, resulting in light leakage, as shown in FIG. 22.

Figure 23:
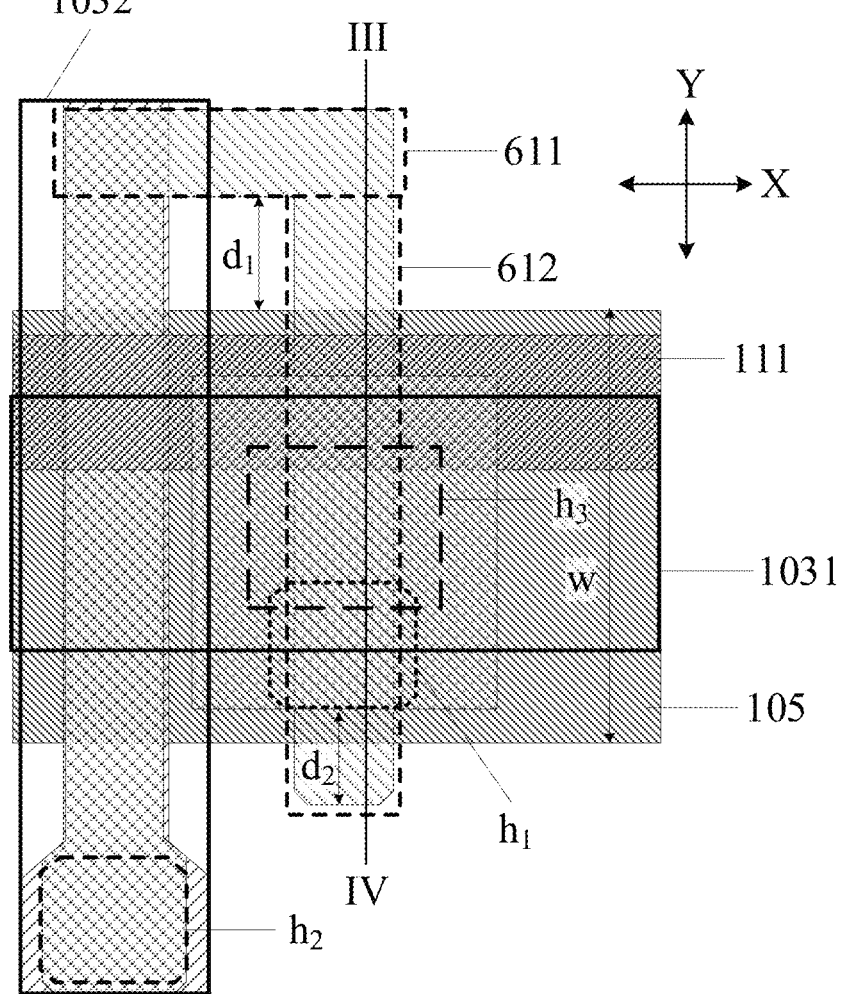
FIG. 23 is another structural schematic diagram of the display substrate provided by an embodiment of the present disclosure.
Figure 24:
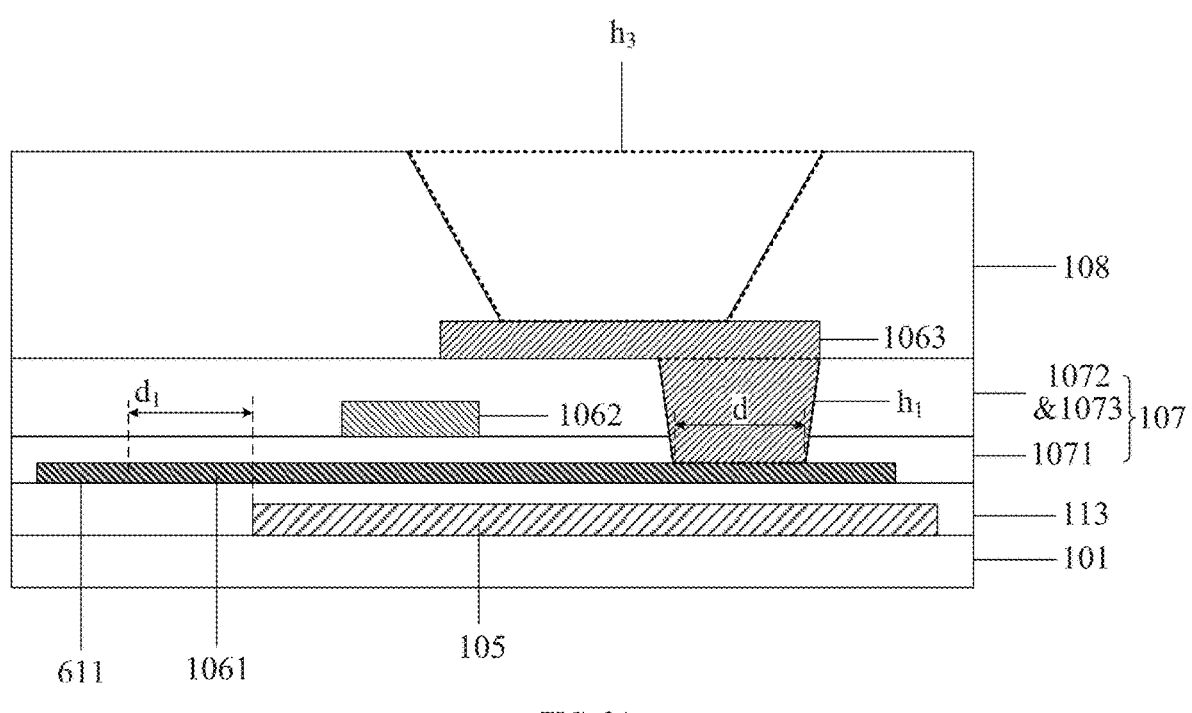
FIG. 24 is a cross-sectional view along a line III-IV in FIG. 23.

Based on this, in order to improve the light leakage problem caused by the active layer (poly) existing in the related art, as shown in FIG. 9, FIG. 23 and FIG. 24, the display substrate provided in the embodiment of the present disclosure, further includes a light-shielding structure 105 and a transistor 106. The transistor 106 includes an active layer 1061 located between the layer where the data line 103 is located and the first base substrate 101. The light-shielding structure 105 is located between the active layer 1061 and the first base substrate 101. The active layer 1061 includes a first portion 611 extending in the direction of the absorption axis of the first polarizer 102 (which equivalent to the above-mentioned X-axis). The distance between the first portion 611 and the light-shielding structure 105 in the extension direction of the data line 103 (which equivalent to the above-mentioned Y-axis) is $d_1$, and $d_1 = c*(l/w)$, where c is greater than 0.446 and less than 2.08. For example, c is greater than or equal to 0.7 and less than or equal to 1.5, l is the length of the pixel opening region along the extension direction of the data line 103 (which equivalent to the Y axis), and w is the width of the light-shielding structure 105 along the extension direction of the data line 103 (which equivalent to the Y axis). When c is less than 0.446, the semiconductor region of the transistor 106 is not turned on enough, and there will be pixel lighting problem. When c is greater than 2.08, the transistor 106 occupies too much space thereby reducing the pixel aperture ratio. Therefore, when $d_1$ satisfies the relational equation $d_1 = c*(l/w)$, the greater pixel aperture ratio and the better characteristics of the transistor 106 can be taken into account.

In some embodiments, $d_1$ is greater than or equal to 1.5 μm and less than 3 μm, e.g., 1.5 μm, 1.55 μm, 1.6 μm, 1.65 μm, 1.7 μm, 1.75 μm, 1.8 μm, 1.85 μm, 1.9 μm, 2 μm, 2.05 μm, 2.1 μm, 2.15 μm, 2.2 μm, 2.25 μm, 2.3 μm, 2.35 μm, 2.4 μm, 2.45 μm, 2.5 μm, 2.55 μm, 2.6 μm, 2.65 μm, 2.7 μm, 2.75 μm, 2.8 μm, or 2.95 μm, etc. In the related art, the distance $d_1$ between the first portion 611 and the light-shielding structure 105 in the extension direction of the data line 103 (which equivalent to the X-axis) is 3 μm. The first portion 611 is placed under the light-shielding structure 105 to the maximum extent in the present disclosure after considering the alignment deviation (OL) between the first portion 611 and the gate 1062 of the transistor 106, the size (CD) fluctuation and the channel range, so that the distance $d_1$ between the first portion 611 and the light-shielding structure 105 in the extension direction (which equivalent to the above-mentioned X-axis) of the data line 103 is greater than or equal to 1.5 μm and less than 3 μm, effectively reducing the proportion of the first portion 611 in the pixel opening region, reducing the amount of backlight irradiated to the active layer 1061, and improving the light leakage defect caused by the active layer 106.

In some embodiments, in the display substrate provided in the present disclosure, as shown in FIG. 9, FIG. 23 and FIG. 24, the transistor 106 may further include a first electrode 1063 located on the side of the layer where the data line 103 is located away from the first base substrate 101. The display substrate further includes an insulating layer 107 located between the active layer 1061 and the first electrode 1063, and the first electrode 1063 is electrically connected with the active layer 1061 through a first via hole h1 penetrating through the insulating layer 107. In the direction that the insulating layer 107 is away from the first base substrate 101, the aperture of the first via hole $h_1$ gradually increases. The aperture of a bottom opening of the first via hole $h_1$ towards the first base substrate 101 is d, the shape of the bottom opening of the first via hole $h_1$ towards the first base substrate 101 may be approximately circular or other shapes, and d is the size of the bottom opening of the first via hole $h_1$ towards the first base substrate 101 in the extension direction of the data line 103 (which equivalent to the above-mentioned Y-axis). The active layer 1061 further includes a second portion 612 extending in the extension direction of the data line 103 (which equivalent to the above-mentioned Y-axis), the orthographic projection of the second portion 612 on the first base substrate 101 and the orthographic projection of the data line 103 on the first base substrate 101 do not overlap with each other. The second portion 612 and the first portion 611 are integrally arranged. The distance between an end, away from the first portion 611, of the second portion 612 and the first via hole $h_1$ in the extension direction of the data line 103 (which equivalent to the above-mentioned Y-axis) is $d_2$, $d_2/d$ is greater than or equal to 0.4 and less than or equal to 1. For example, $d_2/d$ is greater than or equal to 0.5 and less than or equal to 0.7, e.g., 1.4, 0.5, 0.6, 0.7, 0.8, or 0.9, etc. When the $d_2/d$ is less than 0.5, a part of the second portion 612 at the first via hole $h_1$ may be etched, resulting in incomplete contact between the active layer 1061 and the first electrode 1063 and affecting the conduction, and when $d_2/d$ is greater than 0.7, it may occupy too much space and reduce the pixel aperture ratio. Therefore, the disclosure sets $d_2/d$ greater than or equal to 0.5 and less than or equal to 0.7, which can not only ensure that the morphology of the active layer 1061 at the first via hole $h_1$ is better, enhance the electrical connection effect of the active layer 1061 and the first electrode 1063, but also effectively improve the pixel aperture ratio.

In some embodiments, $d_2$ is greater than or equal to 1 μm and less than 2.5 μm, such as 1 μm, 1.1μ, 1.2 μm, 1.3 μm, 1.4 μm, 1.5μ, 1.6 μm, 1.7 μm, 1.8μ, 1.9 μm, 2 μm, 2.1μ, 2.2 μm, 2.3 μm, or 2.4 μm, etc. In the related art, the distance $d_2$ between the end, away from the first portion 611, of the second portion 612 and the first via hole $h_1$ in the extension direction of the data line 103 (which equivalent to the above-mentioned Y-axis) is 2.5 μm. In the present disclosure, the second portion 612 is placed under the light-shielding structure 105 to the maximum extent after considering the alignment deviation (OL) of the second portion 612 and the first via hole $h_1$, the size (CD) fluctuation and channel range, so that the distance $d_2$ between the second portion 612 and the first via hole $h_1$ in the extension direction of the data line 103 (which equivalent to the above-mentioned X axis) is greater than or equal to 1 μm and less than 2.5 μm, effectively reducing the proportion of the second portion 612 in the opening region, reducing the amount of backlight irradiated to the active layer 1061, and improving the light leakage defect caused by the active layer 106. Optionally, the orthographic projection of the first via hole $h_1$ on the first base substrate 101 is located in the orthographic projection of the light-shielding structure 105 on the first base substrate 101 to prevent light leakage at the first via hole $h_1$.

In some embodiments, as shown in FIG. 8 to FIG. 19, FIG. 23 and FIG. 24, the local portion of the data line 103 can be used as the second electrode 1064 of the transistor 106. The insulating layer 107 may include a gate insulating layer 1071 located between the layer where the gate 1062 is located and the active layer 1061, the first interlayer dielectric layer 1072 located between the layer where the gate 1062 is located and the layer where the second electrode 1064 is located, and a second interlayer dielectric layer 1073 located between the layer where the first electrode 1063 is located and the layer where the second electrode 1064 is located. The second electrode 1064 can be electrically connected with the active layer 106 through the second via hole $h_2$ penetrating the gate insulation layer 1071 and the first interlayer dielectric layer 1072. In addition, the display substrate may also include a planarization layer 108 located between the layer where the first electrode 1063 is located and the layer where the common electrode 104 is located, a passivation layer 109 between the planarization layer 108 and the layer where the common electrode 104 is located, and a pixel electrode(s) 110 located between the passivation layer 109 and the planarization layer 108, where the pixel electrode 110 can be electrically connected with the first electrode 1063 through a third via hole $h_3$ penetrating through the planarization layer 108. Optionally, the orthographic projection of the third via hole $h_3$ on the first base substrate 101 is located in the orthographic projection of the light-shielding structure 105 on the first base substrate 101 to prevent light leakage at the third via hole $h_3$. In addition, the display substrate may also include a gate line(s) 111. A part of the gate line 111 can be used as a gate 1062. Optionally, the orthographic projection of the gate line 111 on the first base substrate 101 is located in the orthographic projection of the first light-shielding structure 105 on the first base substrate 101, so as to reduce the light-shielding area as much as possible and ensure the aperture ratio. The other indispensable components of the display substrate should be understood by a person skilled in the art and shall not be repeated herein, nor shall they be used as a restriction on the present disclosure.

Figure 25:
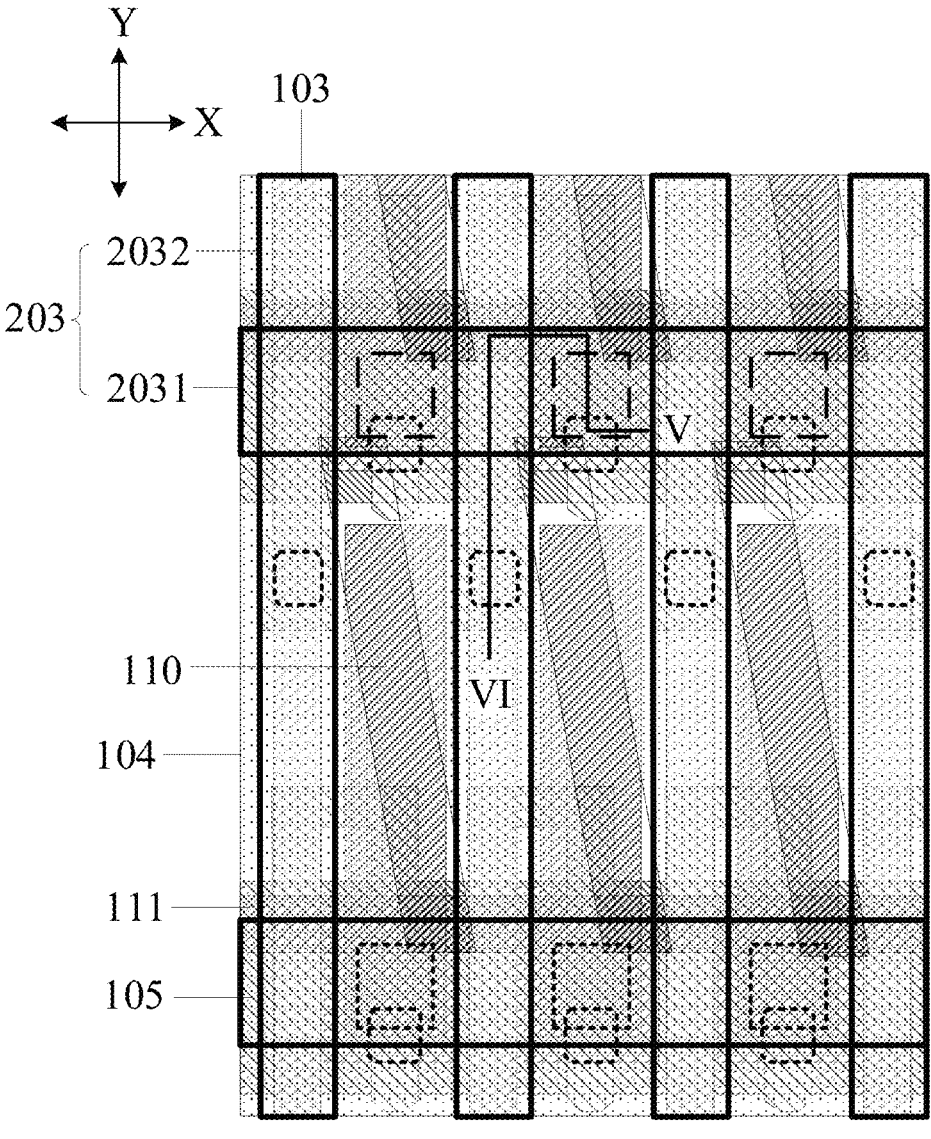
FIG. 25 is a structural schematic diagram of the display panel provided in an embodiment of the present disclosure.
Figure 26:
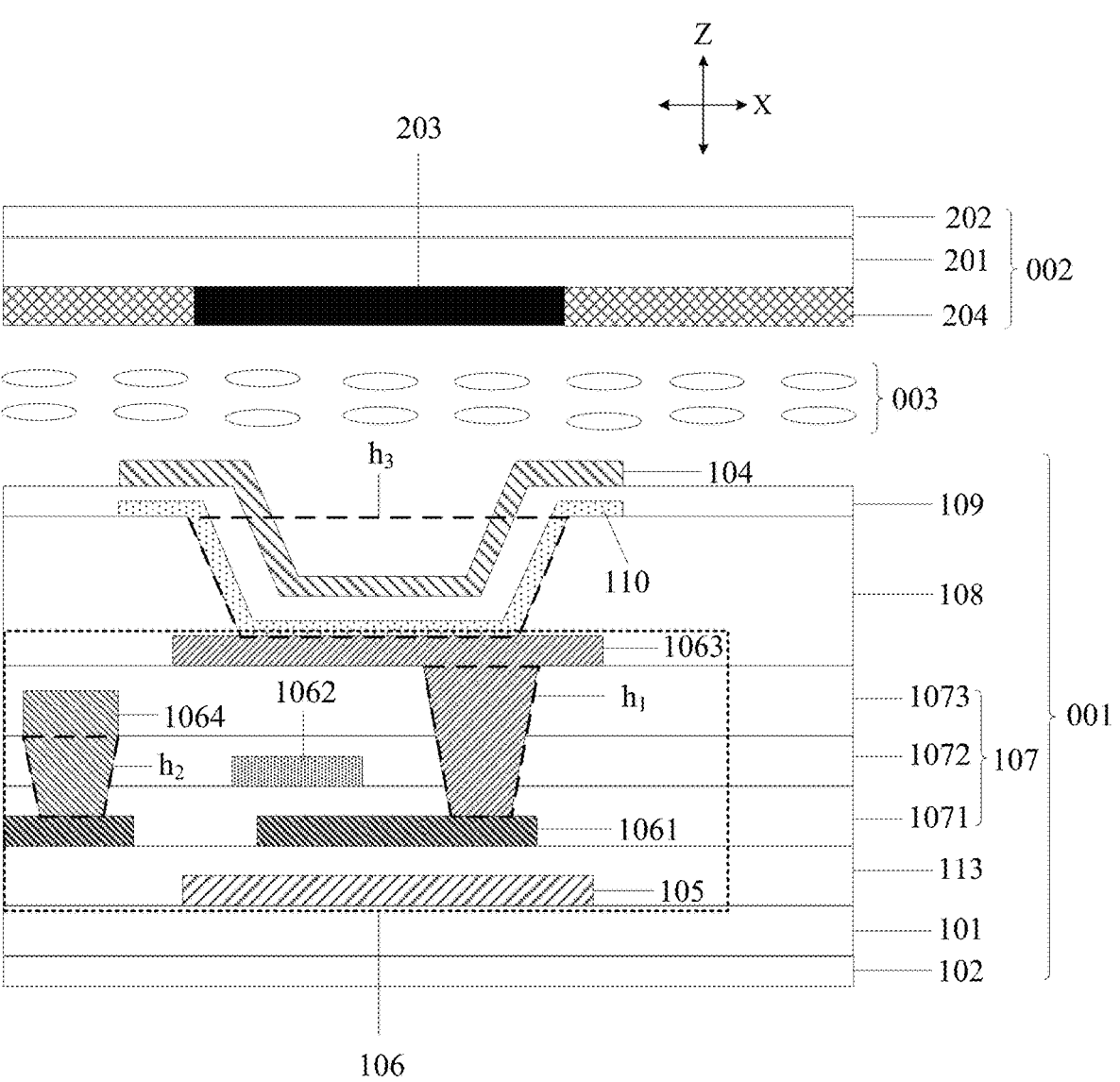
FIG. 26 is a cross-sectional view along a line V-VI in FIG. 25.

Based on the same invention conception, the embodiment of the present disclosure further provides a display panel, as shown in FIG. 25 and FIG. 26, including a display substrate 001 and an opposite substrate 002 which are opposite to each other, and a first liquid crystal layer 003 located between the display substrate 001 and the opposite substrate 002, where the display substrate 001 is the display substrate 001 provided in above embodiments of the present disclosure, and the opposite substrate 002 includes a second base substrate 201, and a second polarizer 202 located on one side of the second base substrate 201 away from the first liquid crystal layer 003. The absorption axis of the second polarizer 202 is substantially parallel to the extension direction of the data line 103, that is, parallel or within the error range caused by factors such as production and measurement. Because the principle of solving the problem of the display panel is similar to the principle of solving the problem of the display substrate, the implementation of the display panel provided in the embodiment of the present disclosure can be referred to the implementation of the display substrate, and the repetition will be omitted.

In some embodiments, in the display panel provided in the embodiment of the present disclosure, as shown in FIG. 25 and FIG. 26, the opposite substrate 002 further includes a black matrix 203 located on one side of the second base substrate 201 facing the first liquid crystal layer 003. The black matrix 203 includes a first black matrix strip 2031 extending along the absorption axis direction (which equivalent to the above-mentioned X axis) of the first polarizer 102. The orthographic projection of the first black matrix strip 2031 on the first base substrate 101 is located in the orthographic projection of the light-shielding structure 105 on the first base substrate 101, so that the blocking layer in the absorption axis direction of the first polarizer 102 (which equivalent to the above-mentioned X axis) is changed from the first black matrix strip 2031 in the opposite substrate 002 to the light-shielding structure 105 of the display substrate 001. Because the light-shielding structure 105, the active layer 1061 most of which is blocked by the light-shielding structure 105, the first via hole $h_1$ which is entirely blocked by and light-shielding structure 105 and penetrates through the insulation layer 107, and the third via hole $h_3$ penetrating through the planarization layer 108 are all located in the display substrate, and the direct alignment accuracy among the film layers in the display substrate is better in comparison to a situation that the alignment between the film layers of the display substrate and the film layers of the opposite substrate fluctuates greatly, so the process accuracy of the shielding is better and the shielding effect is better. In addition, the present disclosure adopts the light-shielding structure 105 in the absorption axis direction (which equivalent to the above-mentioned X-axis) of the first polarizer 102 to satisfy the light-shielding requirements. Therefore, the main function of the first black matrix strip 2031 extending in the direction of the absorption axis of the first polarizer 102 (which equivalent to the above-mentioned X-axis) is changed from light shielding to reducing the reflectivity in the absorption axis direction (which equivalent to the above-mentioned X-axis) of the first polarizer 102.

Figure 27:
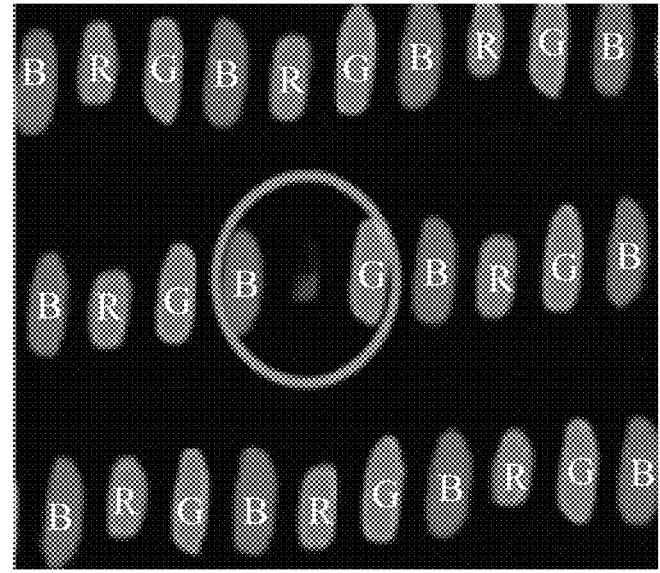
FIG. 27 is a schematic diagram of an actual effect of a black resin material of black matrix remaining in an opening region.
Figure 28:
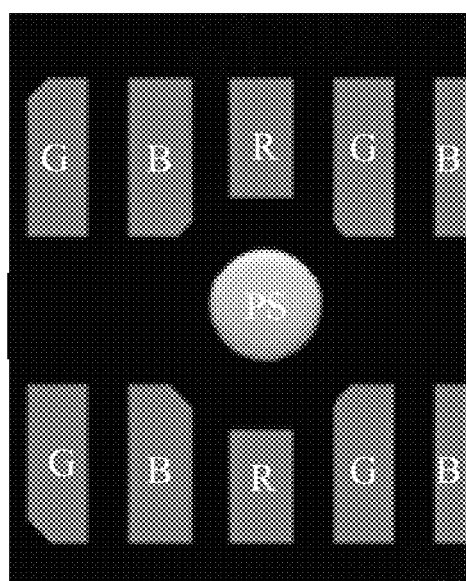
FIG. 28 is a schematic diagram of a design of the black matrix.

In the related art, the black matrix 203 of the opposite substrate 002 is grid-shaped and made of a single-layer black resin material, which has the advantage of low cost, but the shortcomings of this scheme are also obvious. In high-resolution products, especially VR products above 1000 PPI, due to the small pixel size, the actual opening of the mask is small, and it cannot be completely reacted in the exposure process, and because the opening of the black matrix 203 is relatively small, the black resin material in the opening region is not easy to be brought out from the opening by the developer during the development process, As a result, the black resin material (as a dot shown in the elliptical circle in FIG. 27) will remain in the opening region after development, resulting in the actual morphology of the black matrix 203 (as shown in FIG. 27) cannot fully reach the design morphology (as shown in FIG. 28), resulting in the loss of aperture ratio, and even a large amount of residual black resin material in the opening region, resulting in poor visual black spots.

Figure 29:
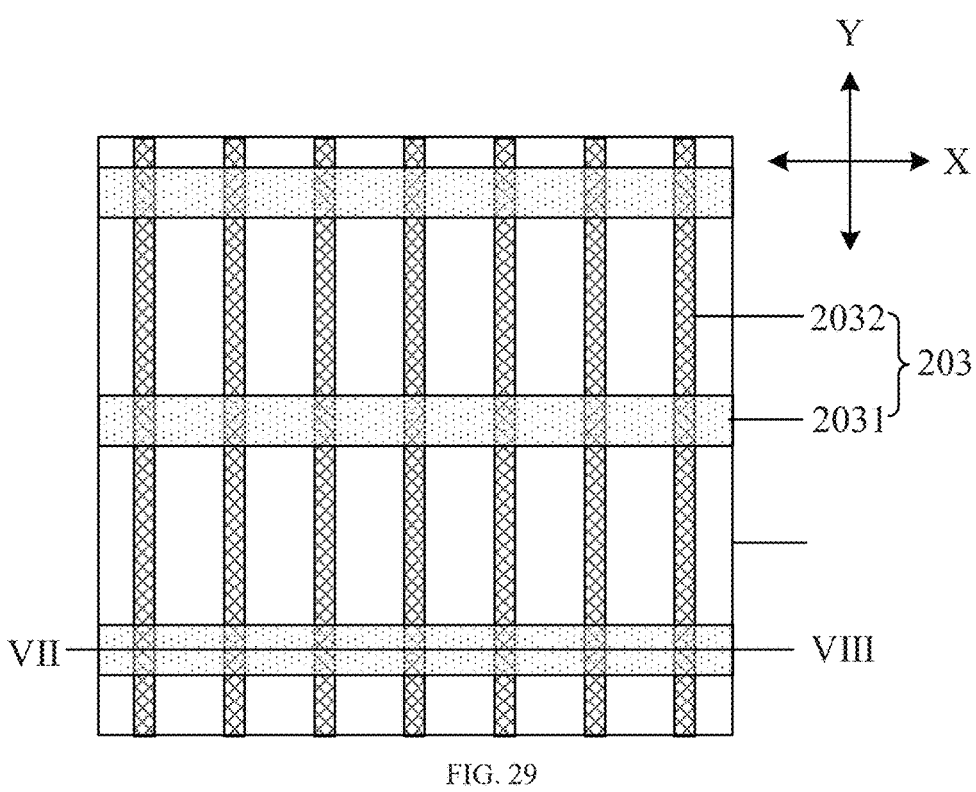
FIG. 29 is a structural schematic diagram of the black matrix provided by an embodiment of the present disclosure.
Figure 30:
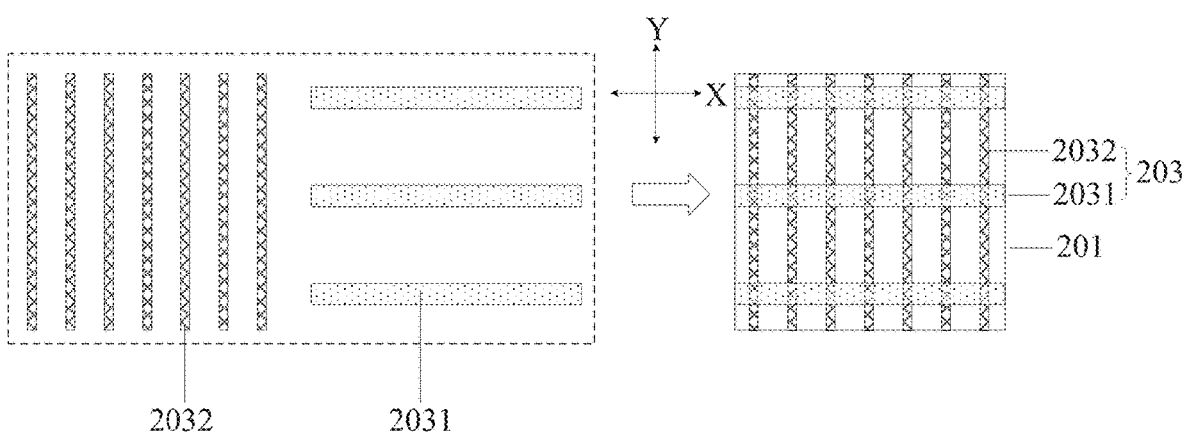
FIG. 30 is a schematic diagram of the first black matrix strip, the second black matrix strip and the black matrix formed by the first black matrix strip and the second black matrix strip provided by an embodiment of the present disclosure.

Based on this, in order to improve the black spot defect, in the display panel provided in the embodiment of the present disclosure, as shown in FIG. 25, FIG. 29 and FIG. 30, the black matrix 203 further includes a second black matrix strip 2032 extending along the extension direction of the data line 103 (which equivalent to the above-mentioned Y-axis) and being arranged in a layer different from a layer where the first black matrix strip 2031 is located. The orthographic projection of the second black matrix strip 2032 on the first base substrate 101 covers the orthographic projection of the data line 103 on the first base substrate 101. The openings defined by the first black matrix strips 2031 and the openings defined by the second black matrix strips 2032 are a plurality of open channels. Therefore, the area of these open channels is generally large, and the black resin material in the opening is relatively easy to be brought out from the opening by the developer during development, so the black resin material that remains in the opening region can be eliminated, and the black spot defect can be improved.

Figure 31:
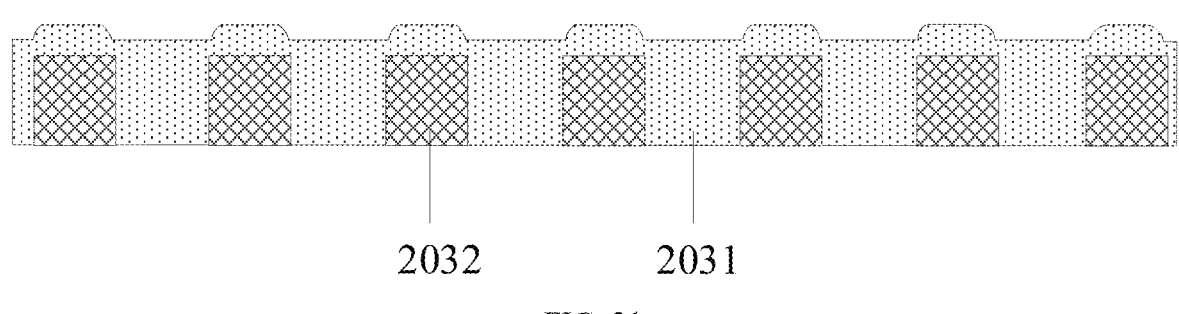
FIG. 31 is a cross-sectional view along the line VII-VIII in FIG. 29.
Figure 32:
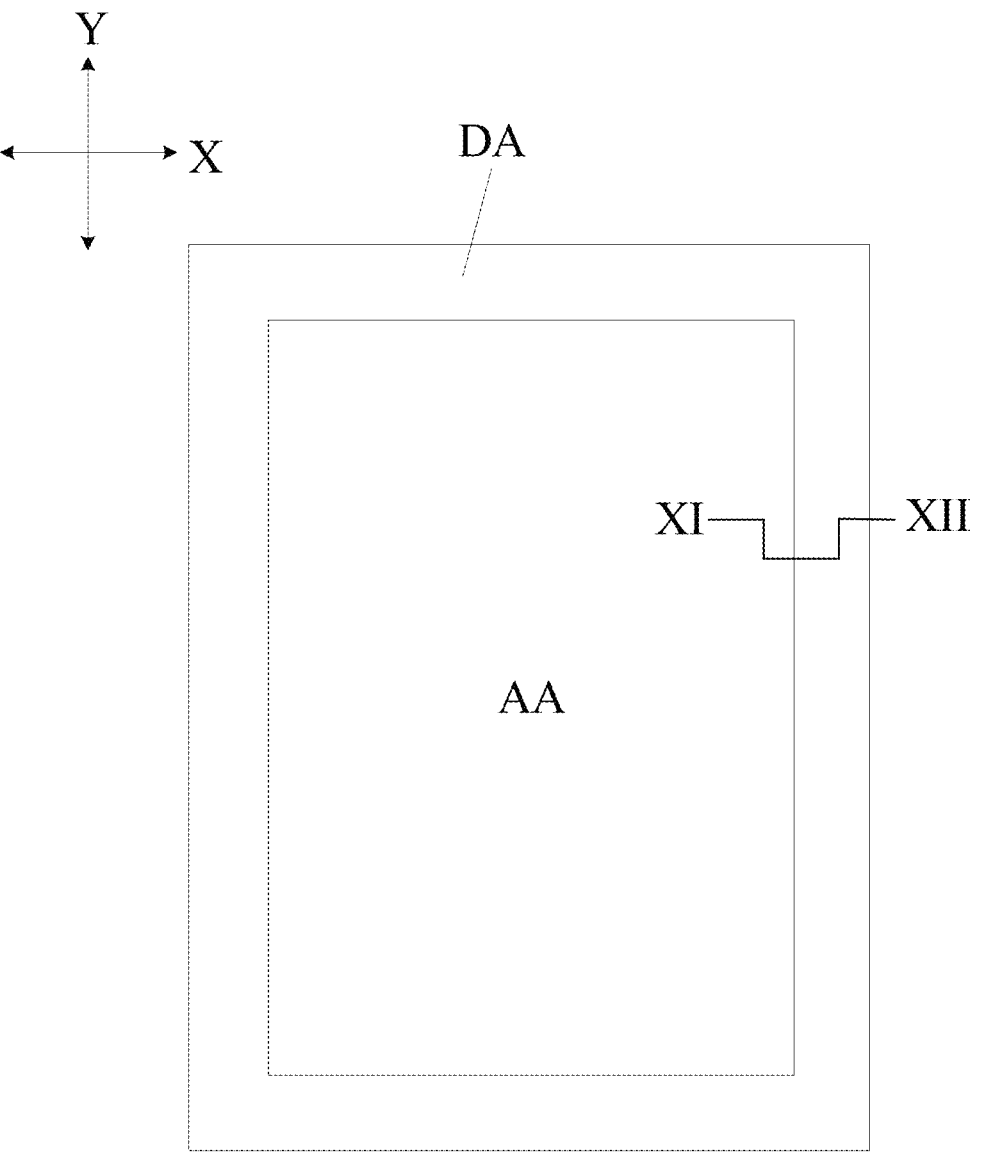
FIG. 32 is another structural schematic diagram of the display panel provided by an embodiment of the present disclosure.
Figure 33:
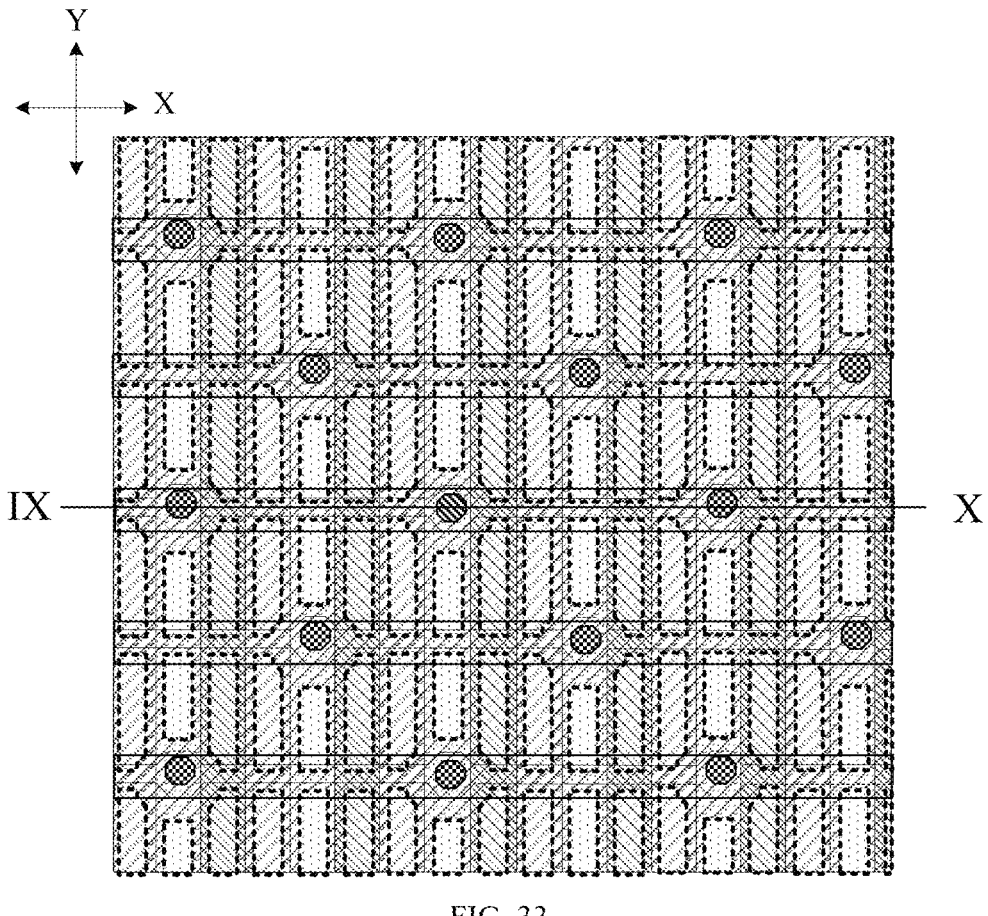
FIG. 33 is a partial enlarged view of a display region in FIG. 32.
Figure 34:
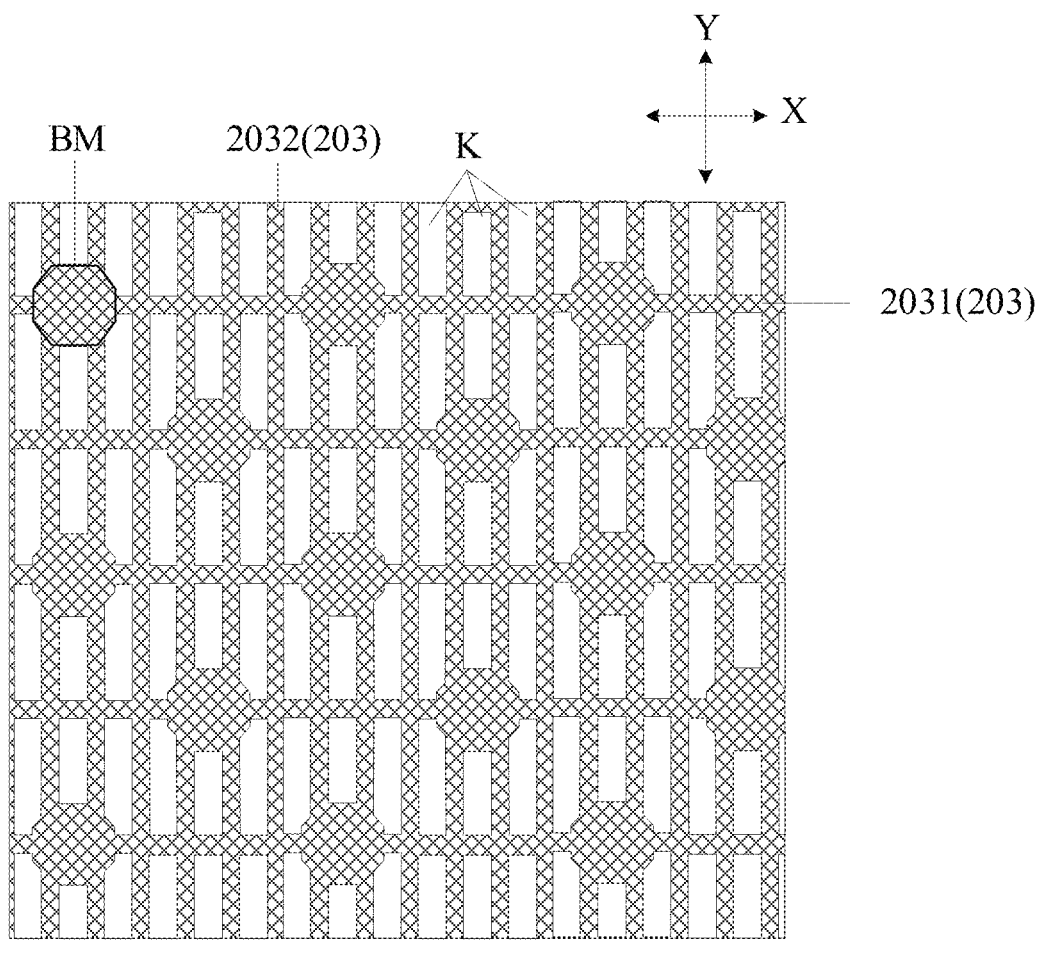
FIG. 34 is a structural schematic diagram of the black matrix in FIG. 33.

In some embodiments, the second black matrix strip 2032 may be arranged to be located on one side of the first black matrix strip 2031 away from the second base substrate 201, or the first black matrix strip 2031 may be arranged to be located on one side of the second black matrix strip 2032 away from the second base substrate 201. Additionally, as shown in FIG. 31, at the overlapping position(s) of the first black matrix strip(s) 2031 and the second black matrix strip(s) 2032, because the materials of the first black matrix strip(s) 2031 and the second black matrix strip(s) 2032 may partially flow to the edge of the grid defined by the first black matrix strip(s) 2031 and the second black matrix strip(s) 2032, so that the thickness of the black matrix 203 at the overlapping position is slightly less than the sum of the thicknesses of the first black matrix strip 2031 and the second black matrix strip 2032. At the non-overlapping position(s) of the first black matrix strip(s) 2031 and the second black matrix strip(s) 2032, the first black matrix strip(s) 2031 may be coplanar with the second black matrix strip(s) 2032, and the thickness of the black matrix 203 at the non-overlapping position(s) is equal to the thickness of the first black matrix strip(s) 2031 or the second black matrix strip(s) 2032.

In some embodiments, a part of the first black matrix strips 2031 and a part of the second black matrix strips 2032 may be arranged in the same one layer, and the remaining first black matrix strips 2031 and the remaining second black matrix strips 2032 may be arranged in another layer, and in order to reduce the residue of the black resin material, the size of the grid defined by the first black matrix strips 2031 and the second black matrix strips 2032 arranged in the same layer may be greater than the size of the grid defined by all the first black matrix strips 2031 and all the second black matrix strips 2032.

It should be noted that in the present disclosure, "arranged in the same one layer" refers to a layer structure formed by using the same one film-forming process to form a film layer for making a specific pattern, and then using the same mask plate through one-time patterning process. That is, one-time patterning process corresponds to one mask plate (also known as a mask). Depending on differences of the particular pattern, one-time patterning process may include multiple exposures, development, or etching, and the specific pattern in the formed layer structure may be continuous or discontinuous, and these specific patterns may be at the same height or have the same thickness, or may be at different heights or have different thicknesses.

In some embodiments, the display panel provided in the present disclosure, as shown in FIG. 32 to FIG. 40, includes a display region AA and a dummy region DA enclosing the display region AA. The black matrix 203 further includes a black matrix block 2033 arranged on the entire surface of the dummy region DA and arranged in a single layer. Optionally, the black matrix block 2033 is arranged in the same one layer as the first black matrix strip 2031 or the second black matrix strip 2032. The thickness of the black matrix block 2033 may be equal to the thickness of the first black matrix strip 2031 or the second black matrix strip 2032, that is, the thickness of the black matrix block 2033 is less than the thickness of the first black matrix strip 2031 and the second black matrix strip 2032 at the overlapping position. For example, the thickness of the black matrix block 2033 is greater than ½ of the thickness of the first black matrix strip 2031 and the second black matrix strip 2032 at the overlapping position. The first black matrix strip 2031 and the second black matrix strip 2032 are located in the display region AA, and the first black matrix strip 2031 and the second black matrix strip 2032 have a widened portion BM at the overlapping position. The opposite substrate 002 further includes a color resistance layer 204 located on the side, facing the first liquid crystal layer 003, of the layer where the black matrix 203 is located, a spacer 205 and a first auxiliary space 206 which is located on the side of the color resistance layer 204 facing the first liquid crystal layer 003 and is arranged in the same layer. The color resistance layer 204 includes a first color resistance strip 2041 located at the display region AA and a second color resistance strip 2042 located at the dummy region DA, and both the first color resistance strip 2041 and the second color resistance strip 2042 extend along the extension direction of the data line 103 (which equivalent to the above-mentioned Y axis). The first color resistance strip 2041 is filled in the grid K defined by the first black matrix strips 2031 and the second black matrix strips 2032 and covers the first black matrix strips 2031 and the second black matrix strips 2032. In the present disclosure, the first color resistance strip 2041 covers the first black matrix strip 2031 and the second black matrix strip 2032, which can be understood as that the orthographic projection of the edge of the first color resistance strip 2041 on the first base substrate 101 overlaps the orthographic projection of the first black matrix strip 2031 on the first base substrate 101 and the orthographic projection of the second black matrix strip 2032 on the first base substrate 101. Moreover, because the material of the first color resistance strip 2041 may flow into the grid K defined by the first black matrix strips 2031 and the second black matrix strips 2032 in the display region AA during the fabrication process, and form a substantially flat surface (i.e., the surface of the first color resistance strip(s) 2041 located in the grid K towards the first liquid crystal layer 003 is flush with the surface of the first color resistance strip 2041 facing the first liquid crystal layer 003 at the widened portion BM or within the error range caused by factors such as production and measurement). Considering that the black matrix block 2033 at the second color resistance strip 2042 is arranged on the whole surface, so that the thickness of the second color resistance strip 2042 is the actual coating thickness, thus the thickness of the first color resistance strip 2041 at the grid K is greater than the thickness of the first color resistance strip 2041 at the widened portion BM and the thickness of the second color resistance strip 2042, and the thickness of the first color resistance strip 2041 at the widened portion BM is smaller than the thickness of the second color resistance strip 2042. Optionally, the orthographic projection of the spacer 205 on the first base substrate 101 is located in the orthographic projection of the widened portion BM on the first base substrate 101. The orthographic projection of the first auxiliary spacer 206 on the first base substrate 101 is located in the orthographic projection of the second color resistance strip 2042 on the first base substrate 101.

Through the above arrangement, the thickness of the opposite substrate 002 at the position of the spacer 205 is substantially equal to the sum of the thickness of the second base substrate 201, the thickness of the widened portion BM, the thickness of the first color resistance strip 2041, and the thickness of the spacer 205. The thickness of the opposite substrate 002 at the position of the first auxiliary spacer 206 is substantially equal to the sum of the thickness of the second base substrate 201, the thickness of the black matrix block 2033, the thickness of the second color resistance strip 2042, and the thickness of the first auxiliary spacer 206. Because the thickness of the widened portion BM can be greater than the thickness of the black matrix block 2033 and the thickness of the first color resistance strip 2041 at the widened portion BM is less than the thickness of the second color resistance strip 2042, the thickness of the opposite substrate 002 at the position of the spacer 205 can be guaranteed to be basically the same as the thickness of the opposite substrate 002 at the position of the first auxiliary spacer 206, so as to ensure the uniformity of the cell gap of the liquid crystal cell.

Figures 39, 40:
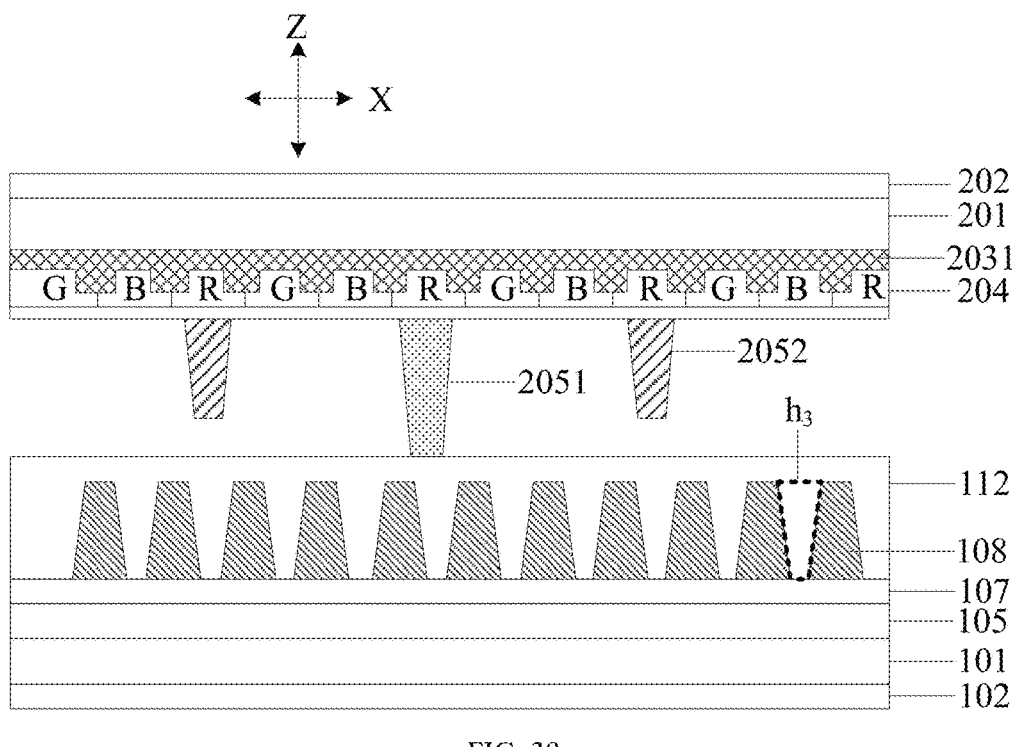
FIG. 39 is a cross-sectional view along a line IX-X in FIG. 33.
FIG. 40 is a cross-sectional view along a line XI-XII in FIG. 32.

Continuing to refer to FIG. 40, a protective layer 207 can further be provided between the layer where the color resistance layer 204 is located and the layer where the spacer 205 is located. Because the protective layer 207 may flow into the grid defined by the first black matrix strips 2031 and the second black matrix strips 2032 in the display region AA, causing the thickness of the protective layer 207 in the display region AA to be less than the thickness of the protective layer 207 in the dummy region DA, and the thickness of the opposite substrate 002 at the position of the spacer 205 is substantially equal to the sum of the thickness of the second base substrate 201, the thickness of the widened portion BM, the thickness of the first color resistance strip 2041, the thickness of the spacer 205 and the thickness of the protective layer 207. The thickness of the opposite substrate 002 at the position of the first auxiliary spacer 206 is equal to the sum of the thickness of the second base substrate 201, the thickness of the black matrix block 2033, the thickness of the second color resistance strip 2042, the thickness of the first auxiliary spacer 206, and the thickness of the protective layer 207. Because the thickness of the widened portion BM can be greater than the thickness of the black matrix block 2033, the thickness of the first color resistance strip 2041 is smaller than the thickness of the second color resistance strip 2042, and the thickness of the protective layer 207 in the display region AA is smaller than that the thickness of the protective layer 207 in the dummy region DA, so that the thickness of the opposite substrate 002 at the position of the spacer 205 can be ensured to be approximately the same as that of the opposite substrate 002 at the position of the first auxiliary spacer 206, so that the uniformity of the cell gap of the liquid crystal cell is more effectively guaranteed.

Figure 35:
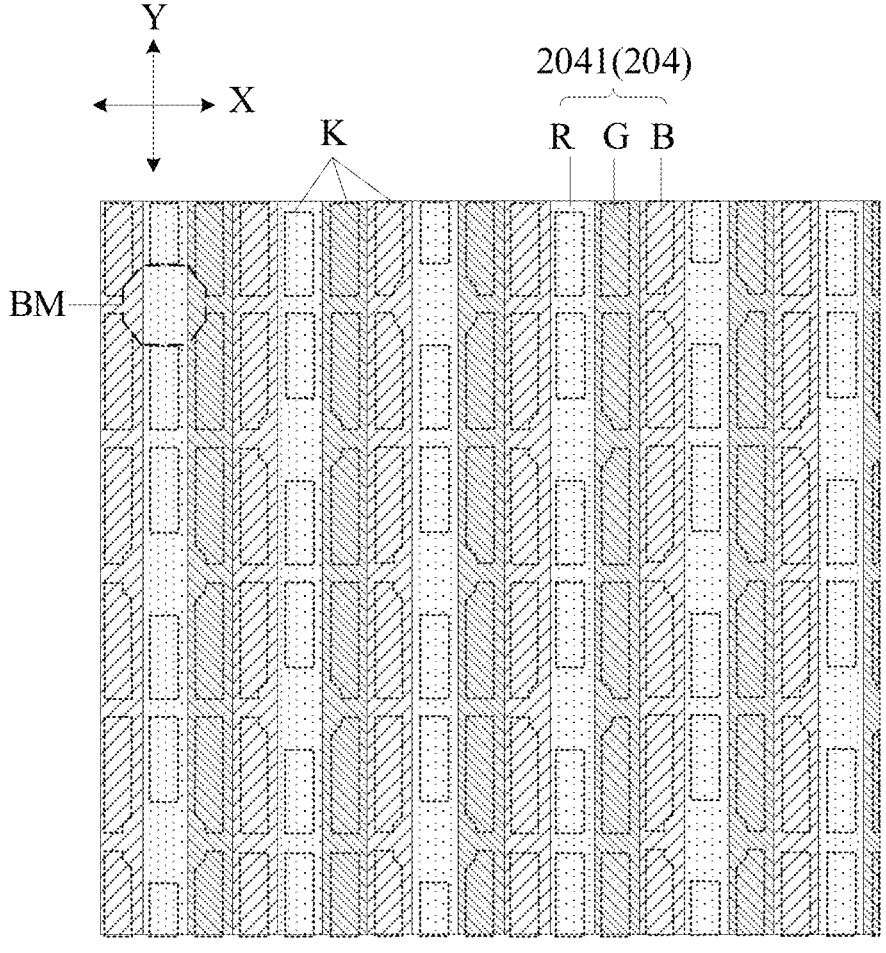
FIG. 35 is a structural schematic diagram of a color resistance layer in FIG. 33.
Figure 36:
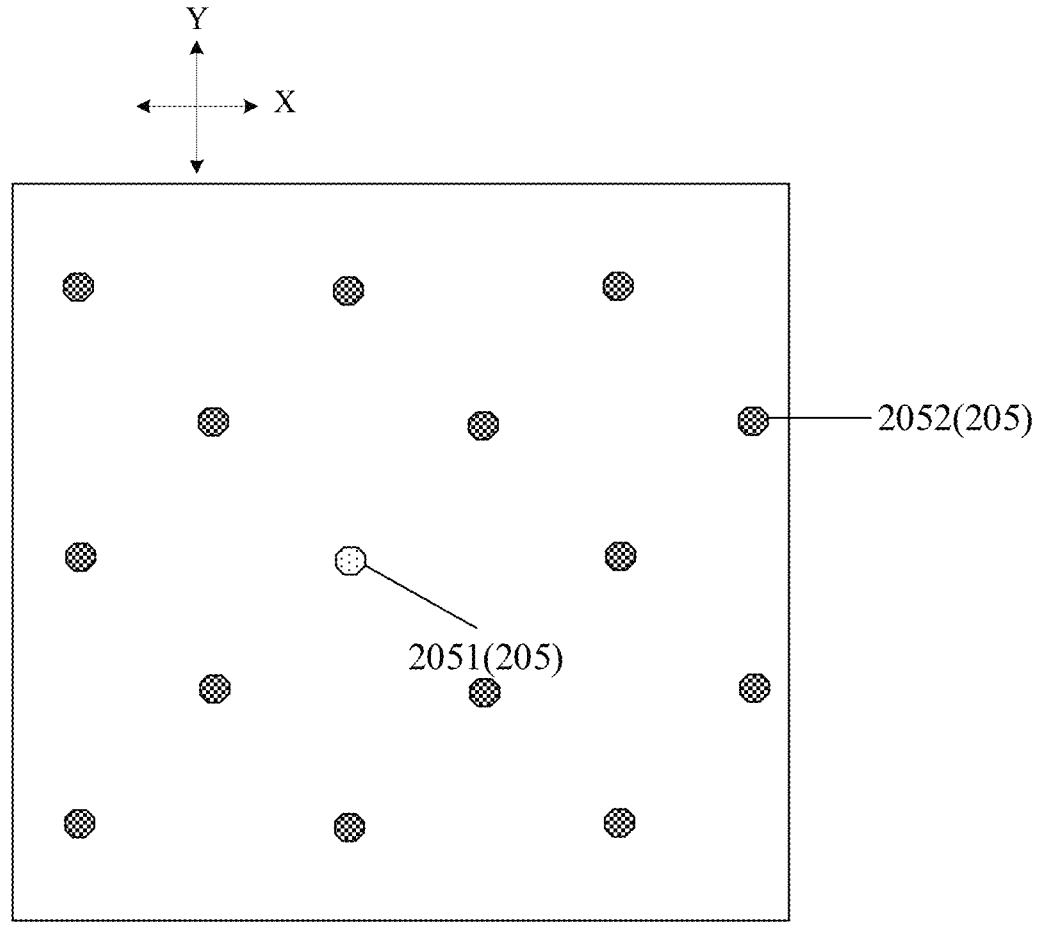
FIG. 36 is a structural schematic diagram of a spacer in FIG. 33.
Figure 37:
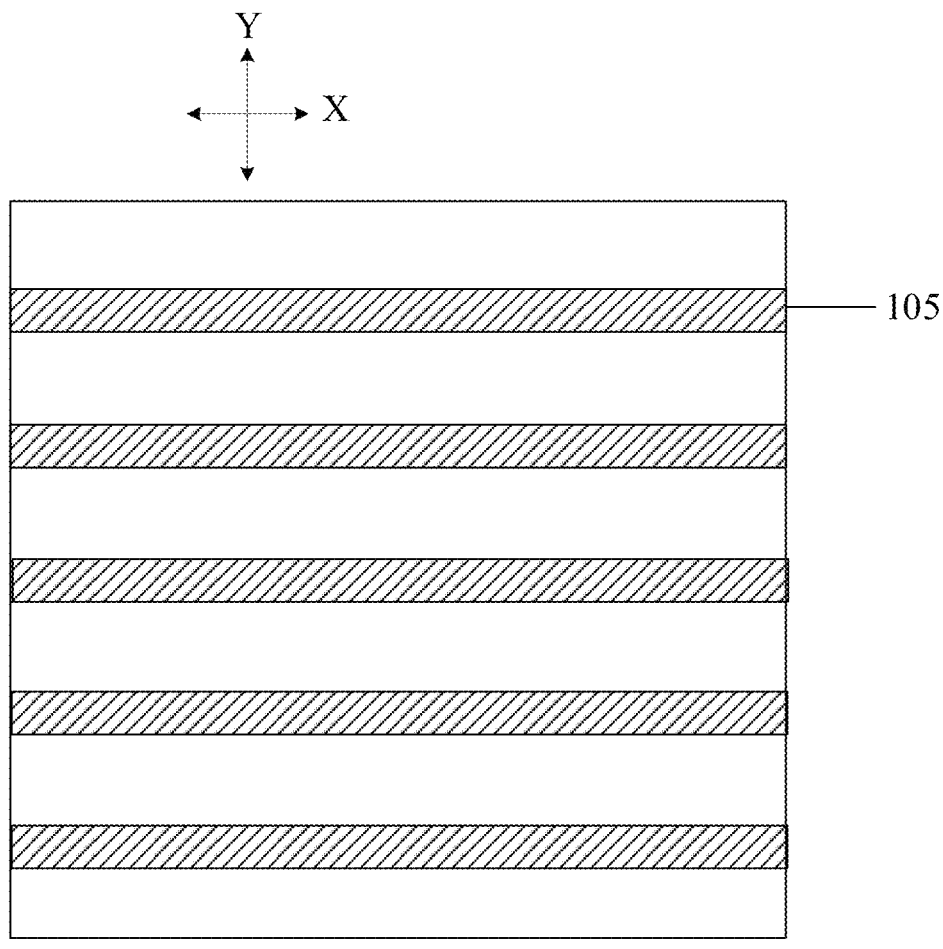
FIG. 37 is a structural schematic diagram of a light-shielding structure in FIG. 33.

In some embodiments, in the display panel provided in the present disclosure, as shown in FIG. 35, the first color resistance strip 2041 includes a red color resistance strip R, a green color resistance strip G and a blue color resistance strip B, etc. Optionally, the second color resistance strip 2042 may include a monochrome color resistance strip of at least one color, such as a red color resistance strip R, a green color resistance strip G and a blue color resistance strip B, etc. In some embodiments, the orthographic projection of the widened portion BM in the display region AA on the first base substrate 101 is penetrated by the orthographic projection of the red color resistance strip R on the first base substrate 101, and the orthographic projection of the spacer 205 on the first base substrate 101 overlaps the orthographic projection of the red color resistance strip R on the first base substrate 101.

Table 1 shows the level of white screen color point(s) (Wx, Wy) in three cases of the spacer 205 being placed on the red color resistance strip R, the green color resistance strip G, and the blue color resistance strip B respectively. In general, the most suitable white screen color point for the human eyes is (0.313 0.329). Because the optical system on the VR machine may shift the white point, so the final white point demand for the screen is (0.303 0.309). The more yellow the white point is, the greater the brightness loss caused by adjusting the color block is. In Table 1, the spacer 205 is placed on the red color resistance strip R as the benchmark, compared with the spacer 205 placed on the blue color resistance strip B. Because the aperture ratio corresponding to the blue color resistance strip B is smaller than the aperture ratio corresponding to the red color resistance strip R, the brightness proportion of the blue color resistance strip B decreases, so the overall color point is yellowish, the backlight color block needs to be adjusted, and the final brightness loss is about 16.4%. Compared with the spacer 205 placed on the green color barrier G, due to the reduction of the proportion of light emergent of the green color resistance strip G, the transmittance is reduced by about 14.6%, although the adjustment of the color block can make up for 6%, but the overall brightness is still reduced by 8.6%.

TABLE 1

| | R | | B | G |
|---|---|---|---|---|
| Wx | 0.303 | 0.345 | 0.303 | 0.315 |
| Wy | 0.309 | 0.322 | 0.309 | 0.265 |
| Transmittance | 100% | 103.6% | 103.6% | 85.4 |
| Backlight color block | Original backlight color block | — | New backlight color block (Brightness reduced by 20%) | New backlight color block (Brightness increased by 6%) |

Figure 38:
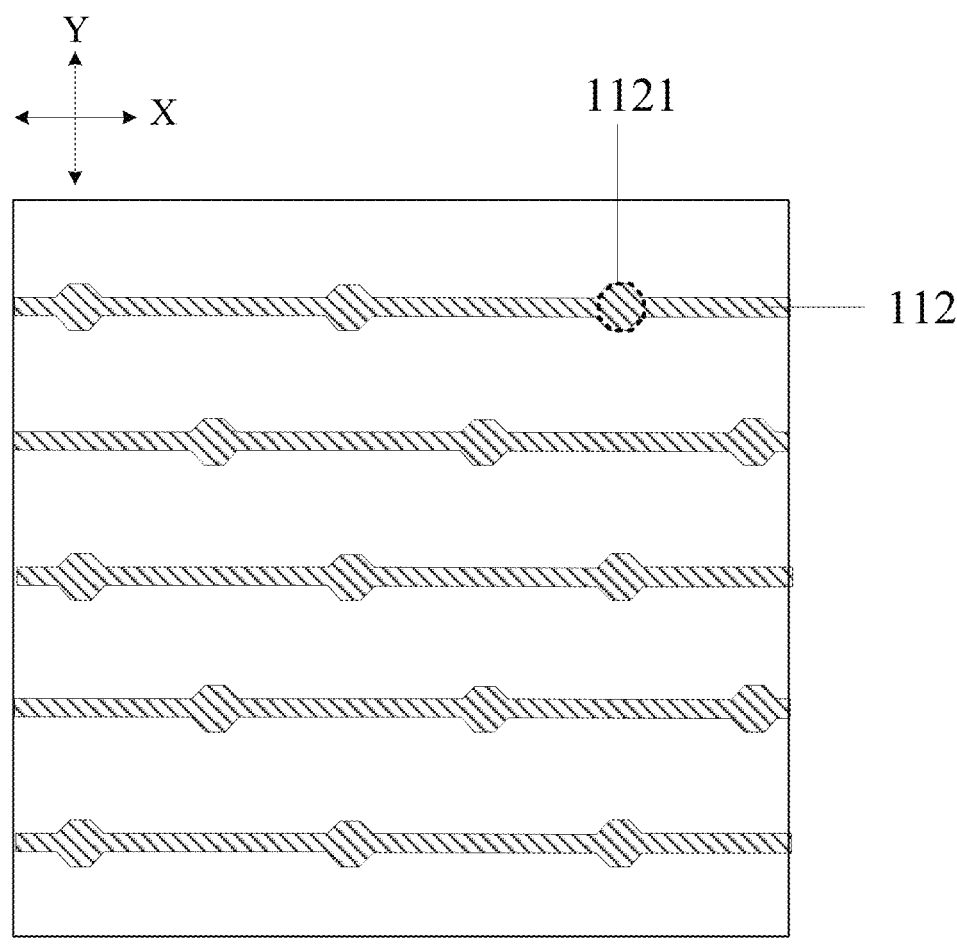
FIG. 38 is a structural schematic diagram of a support layer in FIG. 33.

In some embodiments, in the display panel provided in present disclosure, as shown in FIG. 38 to FIG. 40, the display substrate includes a support layer 112 located on one side of the common electrode 104 away from the first base substrate 101. The support layer 112 includes a first boss 1121 located in the display region AA. The area of a surface of the first boss 1121 towards the first liquid crystal layer 003 is smaller than the area of a surface of the spacer 205 towards the first liquid crystal layer 003. In the related art, a spacer 205 is only arranged in the opposite substrate 002. After the display panel is extruded, the spacer 205 slides greatly and scratches the alignment film (PI) on the side of the display substrate 001, causing serious light leakage. An improvement scheme is to make the main spacer 2051 and the second auxiliary spacer 2052 in the opposite substrate 002. The support layer 112 is further made at the position of the corresponding spacer 205 in the display substrate 001, and the supporting layer 112 has a first boss 1121 supporting the spacer 205, and in the display region AA, the width of the first boss 1121 is greater than the width of the supporting layer 112 outside the first boss 1121, and the sum of the thicknesses of the spacer 205 and the first boss 1121 is the cell gap. After the display panel is extruded in this way, due to the supporting effect of the first boss 1121, the main spacer 2051 cannot scratch the alignment film of the display substrate 001, and the light leakage problem caused by the spacer 205 is effectively solved. However, the scheme is generally arranged with the area of surface of the first boss 1121 facing the first liquid crystal layer 003 larger than the area of surface of the spacer 205 facing the first liquid crystal layer 003. However, when the area of the surface of the first boss 1121 towards the first liquid crystal layer 003 is larger, the surface of the first boss 1121 towards the first liquid crystal layer 003 may form the crater morphology, and the alignment film may accumulate at the crater position, and the spacer 205 may scratch up the alignment film at this position after being compressed, resulting in poor fringes (Zara). The spacer 205 adopts a resin material with elasticity and high sensitivity, and due to the particularity of the material, the crater morphology is not formed no matter the area of the surface of the spacer 205 towards the first liquid crystal layer 003 is larger or smaller. Based on this, the area of the surface of the first boss 1121 towards the first liquid crystal layer 003 is smaller than the area of the surface of the spacer 205 towards the first liquid crystal layer 003, which equivalent to making the area of the surface of the first boss 1121 towards the first liquid crystal layer 003 smaller. As a result, the crater morphology of the first boss 1121 is significantly improved, and the poor fringes (Zara) are successfully improved.

In some embodiments, in the display panel provided in the present disclosure, in order to better avoid the main spacer 2051 from scratching the alignment film of the display substrate 001, in the direction perpendicular to the first base substrate 101 (which equivalent to the Z direction), the height of the first boss 1121 may be greater than the difference between the height of the main spacer 2051 and the height of the second auxiliary spacer 2052. For example, the height of the main spacer 2051 is 1.5 μm, the height of the second auxiliary spacer 2052 is 1.1 μm, and the height of the first boss 1121 is 0.6 μm.

Optionally, as shown in FIG. 40, the height of the second auxiliary spacer 2052 is substantially the same as the height of the first auxiliary spacer 206, that is, the same or within the error range caused by factors such as making and measuring. In some embodiments, as shown in FIG. 40, the supporting layer 112 may further include a second boss 1122, corresponding to the second auxiliary spacer 2052, in the dummy region DA. However, because there are more traces in the dummy region DA of the display substrate 001, which equivalent to that the traces plays the role of raising the second boss 1122, thus the distance between the surface of the second boss 1122 towards the first liquid crystal layer 003 and the first base substrate 101 is greater than the distance between the surface of the first boss 1021 towards the first liquid crystal layer 003 and the first base substrate 101.

In addition, the embodiment of the present disclosure further provides the relevant measured data of the contrast ($CR_1$) of the display panel in the related art and the contrast ($CR_2$) of the display panel in the present disclosure, as shown in Table 2, where the number ① in Table 2 represents the measured data of the contrast of the display panel in the related art, the number ② represents the measured data of the contrast of the display panel in the present disclosure. The units of L255 grayscale brightness and L0 grayscale brightness are nit. As can be seen from Table 2, the measured data of contrasts randomly selected from five display panels and contrast mean values Ave1 in the related art are all smaller than the measured data of contrasts randomly selected from five display panels and contrast mean values Ave2 in the present disclosure. After using the raising scheme, the contrast is significantly improved, with an average increase of about 38%.

TABLE 2

|  | ① |  |  |  |  | Ave1 |
| --- | --- | --- | --- | --- | --- | --- |
| L255 | 334 | 391 | 342.9 | 368.4 | 372.4 | 361.7 |
| L0 | 0.597 | 0.619 | 0.601 | 0.601 | 0.637 | 0.611 |
| $CR_1$ | 560 | 632 | 570 | 613 | 585 | 592 |
|  | ② |  |  |  |  | Ave2 |
| L255 | 613 | 668.1 | 685 | 696 | 671.2 | 666.7 |
| L0 | 0.740 | 0.856 | 0.827 | 0.856 | 0.789 | 0.814 |
| $CR_2$ | 828 | 780 | 828 | 813 | 850 | 819 |

In some embodiments, the above-mentioned display panel provided in the embodiment of the present disclosure, as shown in FIG. 9 and FIG. 24, further includes a buffer layer 113, and the like. Other indispensable components of the display panel should be understood by a person skilled in the art and shall not be repeated herein and shall not be used as a restriction on the present disclosure.

Based on the same invention conception, the embodiment of the disclosure further provides a display device, including a backlight module and a display panel located on the light emergent side of the backlight module, where the display panel is the display panel provided in the embodiments of the present disclosure. Because the principle of the display device to solve the problem is similar to the principle of the display panel to solve the problem, the implementation of the display device provided in the embodiment of the present disclosure can be referred to the implementation of the above display panel, and the repetition will be omitted.

In some embodiments, the backlight module provided in the embodiment of the present disclosure may be a direct-lit backlight module or an edge-lit backlight module. Optionally, the edge-lit backlight module can include a light bar, and a reflector, a light guide plate, a diffuser sheet, a prism group arranged in a stacked manner, etc., with the light bar located on the side in the thickness direction of the light guide plate. The direct-lit backlight module may include a matrix light source, a reflector stacked on the light emergent side of the matrix light source, a diffusion plate and a brightness enhancement film, etc. The reflector includes openings that are directly opposite to the positions of lamp beads in the matrix light source. The lamp beads in the light bar and the lamp beads in the matrix light source can be light-emitting diodes (LEDs), such as miniature light-emitting diodes (Mini LEDs, Micro LEDs, etc.).

Miniature light-emitting diodes in the sub-millimeter or even micron order are self-emitting devices like organic light-emitting diodes (OLEDs). Like organic light-emitting diodes, they have a series of advantages such as high brightness, ultra-low latency, and ultra-large viewing angle. In addition, because inorganic light-emitting diodes emit light based on metal semiconductors with more stable properties and lower resistance, they have the advantages of lower power consumption, higher temperature and low temperature resistance, and longer service life than organic light-emitting diodes that emit light based on organic matter. Moreover, when the miniature light-emitting diodes are used as the backlight, they can achieve a more precise and dynamic backlight effect, which can effectively improve the brightness and contrast of the screen, and at the same time, can also solve the glare phenomenon caused by the traditional dynamic backlight between the bright and dark regions of the screen, and optimize the visual experience.

Figure 41:
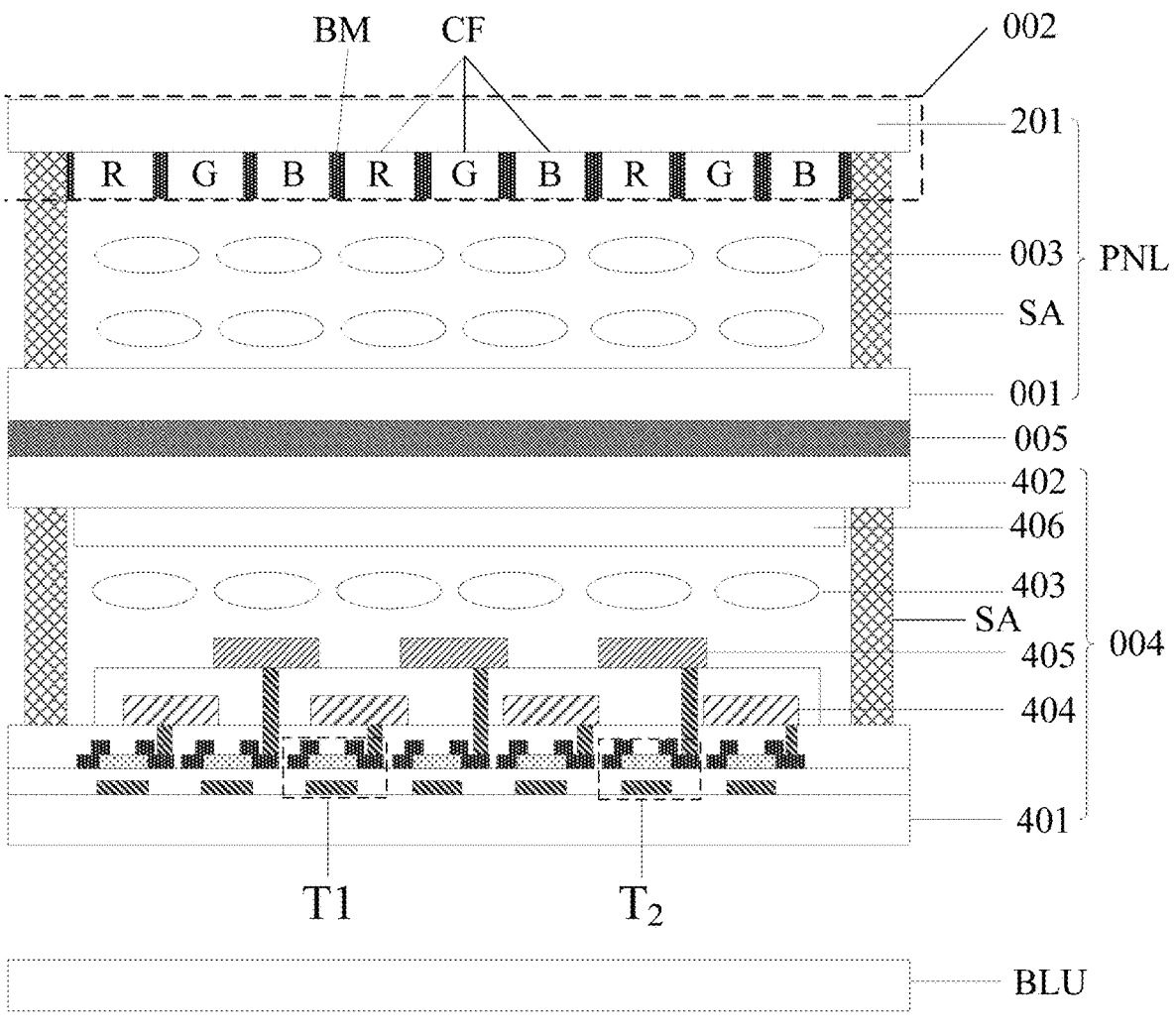
FIG. 41 is a structural schematic diagram of a display device provided by an embodiment of the present disclosure.

In some embodiments, the display device provided in the embodiment of the present disclosure may be a 3D display device, as shown in FIG. 41, and the 3D display device may further include a liquid crystal grating 004 positioned between the backlight module BLU and the display substrate 001. The liquid crystal grating 004 can be fixed together with the display substrate 001 through an adhesive layer 005. Optionally, according to the current position where the viewer's eyes are located, the liquid crystal grating 004 can be controlled to form a light transmission region and a light shielding region which are alternately arranged, so that the viewer's left eye can see the left eye image displayed by the display panel PNL (including the display substrate 001, the opposite substrate 002, the first liquid crystal layer 003, the sealing glue SA, etc.) through the light transmission region of the liquid crystal grating 004, and the viewer's right eye can see the right eye image displayed by the display panel PNL through the light transmission region. By arranging the liquid crystal grating 004 on the light incident side of the display panel PNL, when the display panel PNL includes a touch electrode, the liquid crystal grating 004 does not shield the touch electrode to avoid the problem of touch failure, so that the touch sensitivity and accuracy can be improved.

In some embodiments, as shown in FIG. 41, the liquid crystal grating 004 may include a third base substrate 401 and a fourth base substrate 402 positioned oppositely, a second liquid crystal layer 403 between the third base substrate 401 and the fourth base substrate 402, a first striped electrode 404 located on one side of the third base substrate 401 towards the second liquid crystal layer 403, a second striped electrode 405 located on one side, facing the second liquid crystal layer 403, of the layer where the first striped electrode 404 is located, a planer electrode 406 located on one side of the fourth base substrate 402 facing the second liquid crystal layer 403, a first transistor T1 electrically connected to the first striped electrode 404, a second transistor T2 electrically connected to the second striped electrode 405, and a sealing adhesive SA that encloses the second liquid crystal layer 403 and is between the third base substrate 401 and the fourth base substrate 402. In the specific embodiment, by powering up the first striped electrode 404, the second striped electrode 405 and the planer electrode 406, the second liquid crystal layer 403 can be controlled to form a light transmission region and a light shielding region, so as to cooperate with the liquid crystal display panel PNL that outputs a left eye image and a right eye image to realize 3D display.

Figure 42:
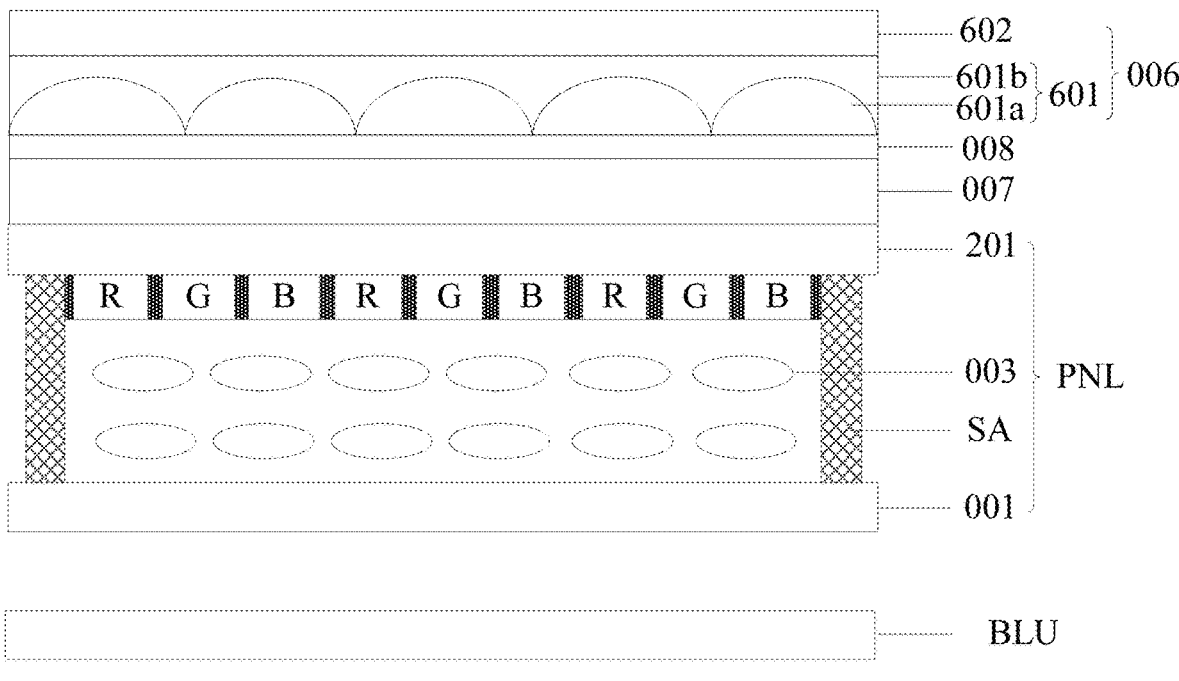
FIG. 42 is another structural schematic diagram of a display device provided by an embodiment of the present disclosure.

In some embodiments, the display device provided in the embodiment of the disclosure may be a 3D display device, as shown in FIG. 42, the 3D display device may further include a light splitting component 006 positioned at the light emergent side of the display panel PNL. Optionally, the light splitting component 006 includes a plurality of light splitting structures 601 parallel to each other and arranged side by side. Each of the splitting structures 601 can be a composite lens formed by a high-refractive resin layer 601a and a low-refractive resin layer 601b. Specifically, the high-refractive resin layer 601a includes a plurality of cylindrical lenses. The low-refractive resin layer 601b fills the gap between the cylindrical lenses, and the thickness of the low-refractive resin layer is greater than the arch height of the cylindrical lenses. The cylindrical lenses can be edged or non-edged. Optionally, the composite lens can be made of transparent material as a substrate 602. Exemplarily, the substrate 602 may be made of polyethylene terephthalate (PET). In some embodiments, a spacer glass 007 can be arranged between the display panel PNL and the light splitting component 006, and the spacer glass 007 and the light splitting component 006 are laminated and fixed through an optical glue 008.

In the specific embodiment, by setting the image plane of the display panel PNL on the focal plane of the cylindrical lenses, the pixel(s) below each cylindrical lens are divided into several sub-pixels, the pixels at different positions on the display panel PNL are subjected to refraction and light splitting through the cylindrical lens, and the light path changes so that different viewpoints are formed in space. When the left eye receives the left viewpoint image, the right eye also receives the right viewpoint image at the same time, and 3D display is realized.

Figure 43:
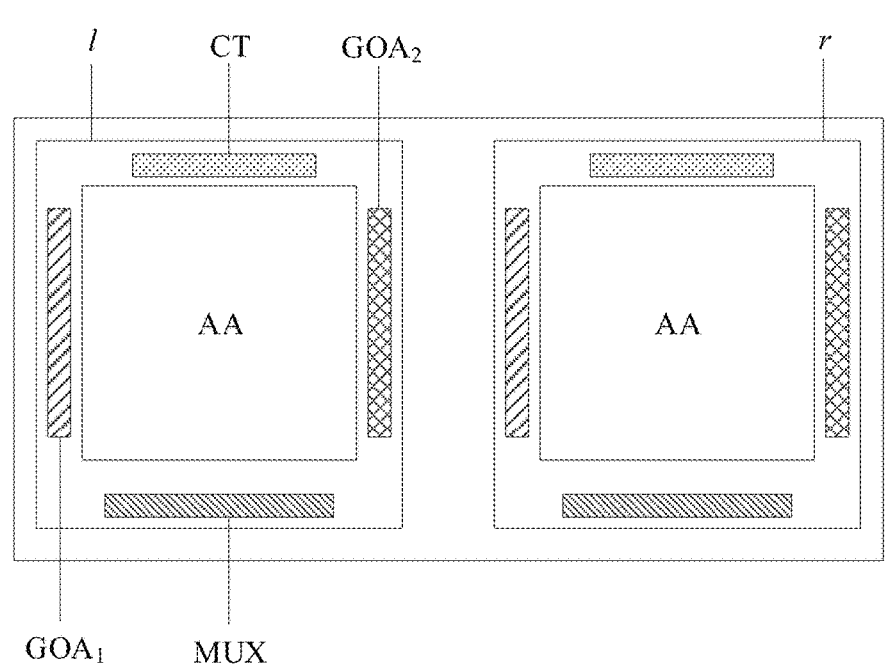
FIG. 43 is another structural schematic diagram of a display device provided by an embodiment of the present disclosure.
Figure 44:
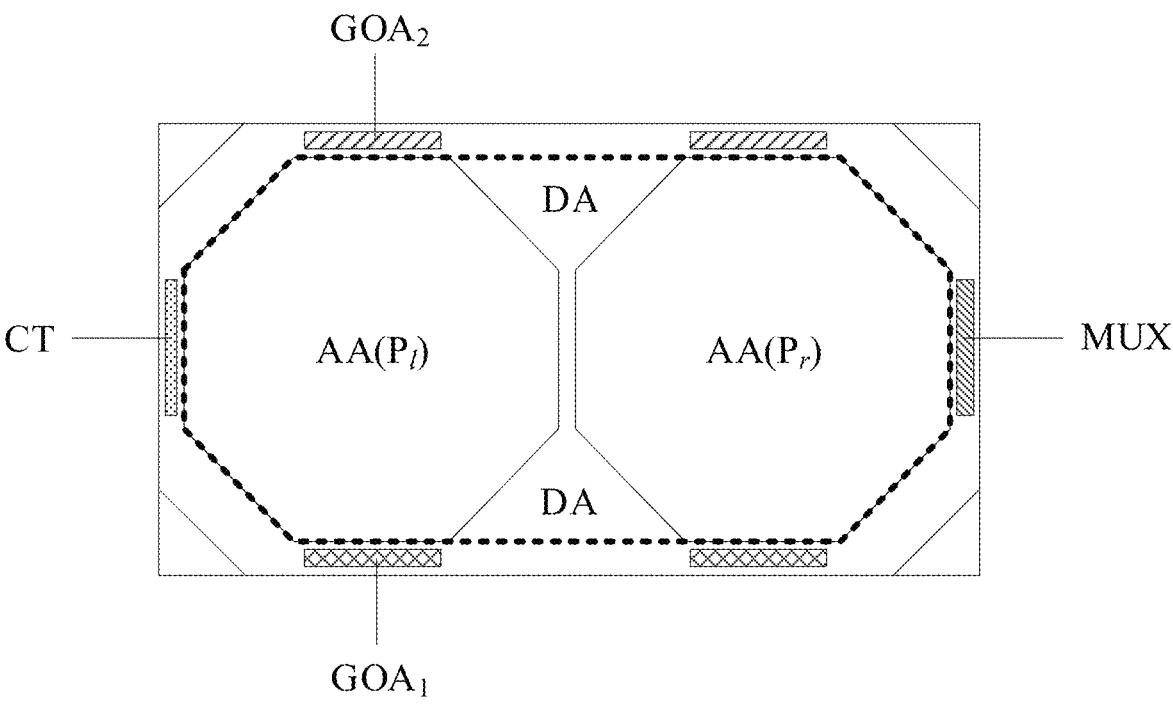
FIG. 44 is another structural schematic diagram of a display device provided by an embodiment of the present disclosure.

FIGS. 43 and 44 illustrate the application of the display device provided in the present disclosure to virtual reality (VR) glasses. Optionally, the virtual reality glasses shown in FIG. 43 include two display screens l and r, through which different pictures are provided to the left eye and the right eye to realize virtual reality display. The two display screens l and r respectively include the display panel provided in the embodiments of the present disclosure. The virtual reality glasses shown in FIG. 44 include a display screen, in which the display region AA includes effective pixels that can display a screen, and the dummy region DA includes dummy pixels that cannot display a screen, and the dummy pixels are used for preventing the layers of the effective pixels from being line broken badly. Optionally, the display region AA includes the left eye pixel region $P_1$ and the right eye pixel region $P_r$. The left eye pixel region $P_1$ and the right eye pixel region $P_r$ respectively display different pictures to achieve virtual reality display. In some embodiments, the left eye pixel region $P_1$ and the right eye pixel region $P_r$ are regular octagons, and the display region AA is an octagon. Of course, the left eye pixel region $P_1$, the right eye pixel region $P_r$ and the display region AA can also have other shapes, and no specific limitations are made here. Continuing with FIGS. 43 and 44, it can be seen that the virtual reality glasses can further include the first gate drive circuit $GOA_1$, the second gate drive circuit $GOA_2$, the test circuit CT, and the multiplexer circuit MUX which are arranged around the display region AA. The other indispensable components of virtual reality glasses should be understood by a person skilled in the art and shall not be repeated herein and should not be used as a limitation on the present disclosure.

In some embodiments, the display device may be: projector, 3D printer, virtual reality device, mobile phone, tablet computer, television, display, notebook computer, digital photo frame, navigator, smart watch, fitness wristband, personal digital assistant and any other product or part with display function. Optionally, the above display devices include, but are not limited to: radio frequency unit, network module, audio output & input unit, sensor, display unit, user input unit, interface unit, control chip, or other components. Optionally, the control chip is a central processing unit, a digital signal processor, or a system-on-chip (SoC), etc. For example, the control chip can also include memory, power module, etc., and realize power supply and signal input and output functions through separately arranged wires, signal lines, etc. For example, a control chip can also include hardware circuitry as well as executable code for a computer. Hardware circuitry can include conventional very large scale integrated circuits (VLSI) or gate arrays, as well as existing semiconductors such as logic chips, transistors, or other discrete components. Hardware circuits can also include field-programmable gate arrays, programmable array logic, programmable logic devices, and so on. In addition, those skilled in the art can understand that the above structure does not constitute a limitation of the above display device, in other words, the above display device may include more or fewer of the above parts, or combine certain parts, or arrange different parts.

Obviously, a person skilled in the art may make various changes and variants to the embodiments of the present disclosure without departing from the spirit and scope of the embodiments of the present disclosure. Thus, if these modifications and variants of the embodiment of the present disclosure fall within the scope of the claims of the present disclosure and their equivalents, the present disclosure is also intended to include such modifications and variants.

What is claimed is:

1. A display panel, comprising: a display substrate and an opposite substrate opposite to the display substrate, and a liquid crystal layer between the display substrate and the opposite substrate, wherein the display substrate comprises: a first base substrate, a first polarizer located on a side of the first base substrate, and a data line located on a side, away from the first polarizer, of the first base substrate, wherein an extension direction of the data line is substantially perpendicular to an absorption axis of the first polarizer; the opposite substrate comprises a second base substrate and a second polarizer arranged on a side, away from the liquid crystal layer, of the second base substrate, and an absorption axis of the second polarizer is substantially parallel to the extension direction of the data line;

wherein the opposite substrate further comprises a black matrix arranged on a side, facing the liquid crystal layer, of the second base substrate, the black matrix comprises a first black matrix strip extending along the absorption axis of the first polarizer, and an orthographic projection of the first black matrix strip on the first base substrate is located in an orthographic projection of the light-shielding structure on the first base substrate;

wherein the black matrix further comprises a second black matrix strip extending along the extension direction of the data line and being arranged in a layer different from a layer where the first black matrix strip is located, and an orthographic projection of the second black matrix strip on the first base substrate covers the orthographic projection of the data line on the first base substrate;

wherein the display panel further comprises a display region and a dummy region surrounding the display region, the black matrix further comprises a black matrix block arranged in a single layer on an entire surface of the dummy region, the first black matrix strip and the second black matrix strip are located in the display region, and the first black matrix strip and the second black matrix strip comprise a widened portion at an overlapping position where the first black matrix strip and the second black matrix strip overlap with each other;

the opposite substrate further comprises a color resistance layer located on a side, facing the liquid crystal layer, of a layer where the black matrix is located, the color resistance layer comprises a first color resistance strip located in the display region and a second color resistance strip located in the dummy region, and the first color resistance strip and the second color resistance strip each extend along the extension direction of the data line; the first color resistance strip fills a grid defined by the first black matrix strip and the second black matrix strip and covers the first black matrix strip and the second black matrix strip, a thickness of the first color resistance strip at the grid defined by the first black matrix strip and the second black matrix strip is greater than a thickness of the first color resistance strip at the widened portion and is greater than a thickness of the second color resistance strip, and the thickness of the first color resistance strip at the widened portion is less than the thickness of the second color resistance strip.

2. The display panel of claim 1, wherein the opposite substrate further comprises a spacer and a first auxiliary spacer which are on a side, facing the liquid crystal layer, of the color resistance layer and arranged in one layer; wherein an orthographic projection of the spacer on the first base substrate is located in an orthographic projection of the widened portion on the first base substrate, and an orthographic projection of the first auxiliary spacer on the first base substrate is located in an orthographic projection of the second color resistance strip on the first base substrate.

3. The display panel of claim 2, wherein the first color resistance strip comprises a red color resistance strip, the orthographic projection of the widened portion on the first base substrate is penetrated by an orthographic projection of the red color resistance strip on the first base substrate, and the orthographic projection of the spacer on the first base substrate overlaps the orthographic projection of the red color resistance strip on the first base substrate.

4. The display panel of claim 2, wherein the display substrate comprises a support layer on a side, away from the first base substrate, of the common electrode, the support layer comprises a first boss in the display region, and an area of a surface, facing the liquid crystal layer, of the first boss is less than an area of a surface, facing the liquid crystal layer, of the spacer.

5. The display panel of claim 4, wherein the spacer comprises a main spacer and a second auxiliary spacer, and in a direction perpendicular to the first base substrate, a height of the first boss is greater than a difference between a height of the main spacer and a height of the second auxiliary spacer.

6. The display panel of claim 2, further comprising a protective layer located between the color resistance layer and a layer where the spacer is located, and a thickness of the protective layer in the display region is less than a thickness of the protective layer in the dummy region.

7. The display panel of claim 1, wherein the black matrix block and the first black matrix strip are arranged in one layer, or the black matrix block and the second black matrix strip are arranged in one layer.

8. The display panel of claim 1, wherein a thickness of the black matrix block is equal to a thickness of the first black matrix strip, or a thickness of the second black matrix strip.

9. The display panel of claim 1, wherein the display substrate is applied to a liquid crystal display panel, and a ratio of a thickness of the data line in a direction perpendicular to the first base substrate to a cell gap of the liquid crystal display panel is greater than or equal to 0.14 and less than or equal to 0.27.

10. The display panel of claim 9, wherein a slope angle of the data line is $\alpha$, $\tan \alpha = a*b$, wherein a is greater than or equal to 2.66, and b is the cell gap of the liquid crystal display panel.

11. The display panel of claim 10, wherein the slope angle $\alpha$ of the data line is greater than 75° and less than 90°.

12. The display panel of claim 1, wherein the display substrate further comprises an interlayer dielectric layer located on a side, away from the first base substrate, of a layer where the data line is located, the interlayer dielectric layer comprises at least one interlayer dielectric sub-layer, and a sum of a product of a refractive index and a thickness of each interlayer dielectric sub-layer is an integer multiple of $\lambda/4$.

13. The display panel of claim 1, wherein the display substrate further comprises a common electrode, the common electrode is located on a side, away from the first base substrate, of the layer where the data line is located, the common electrode comprises a slit, and an angle between an extension direction of the slit and the absorption axis of the first polarizer is greater than or equal to 80° and less than or equal to 100°.

14. The display panel of claim 1, wherein the display substrate further comprises a light-shielding structure and a transistor, the transistor comprises an active layer located between the layer where the data line is located and the first base substrate, and the light-shielding structure is located between the active layer and the first base substrate;

the active layer comprises a first portion extending in a direction of the absorption axis of the first polarizer, a distance between the first portion and the light-shielding structure in the extension direction of the data line is $d_1$, $d_1 = c*(L/W)$, wherein c is greater than 0.446 μm and less than 2.08 μm, L is a length of the pixel opening region along the extension direction of the data line, and W is a width of the light-shielding structure along the extension direction of the data line.

15. The display panel of claim 14, wherein the transistor comprises a first electrode on a side, away from the first base substrate, of the layer where the data line is located, the display substrate further comprises an insulating layer between the active layer and the first electrode, the first electrode is electrically connected with the active layer by a via hole penetrating through the insulating layer, an aperture of the via hole gradually increases in a direction that the insulating layer is away from the first base substrate, and an aperture of a bottom opening, facing the first base substrate, of the via hole is d; and the active layer further comprises a second portion extending in the extension direction of the data line, an orthographic projection of the second portion on the first base substrate and an orthographic projection of the data line on the first base substrate do not overlap with each other, the second portion is integrally arranged with the first portion, a distance between one end, away from the first portion, of the second portion and the via hole in the extension direction of the data line is $d_2$, and $d_2/d$ is greater than or equal to 0.4 and less than or equal to 1.

16. A display device, comprising a backlight module and a display panel arranged on a light emergent side of the backlight module, wherein the display panel is a display panel as claimed in claim 1.

\* \* \* \* \*